United States Patent" [19]

Ishige et al.

[11] Patent Number: 4,946,551
[45] Date of Patent: Aug. 7, 1990

[54] METHOD AND APPARATUS FOR LAMINATING THERMOPLASTIC SHEETS

[75] Inventors: Yoshiki Ishige; Shoji Sato; Hisashi Masuda; Yoji Ushiki; Kiyoshi Kumagai; Junichi Saida; Kiyoshi Minoya, all of Sayama, Japan

[73] Assignee: Honda Gikin Kogyo Kabushiki Kaisha, Tokyo, Japan

[21] Appl. No.: 391,987

[22] Filed: Aug. 10, 1989

[30] Foreign Application Priority Data

Aug. 10, 1988 [JP] Japan .................. 63-198069
May 31, 1989 [JP] Japan .................. 1-135898

[51] Int. Cl.⁵ ............................................. B32B 5/02
[52] U.S. Cl. .................................. 156/222; 156/322;
  156/309.9; 156/380.9; 156/563; 156/566;
  294/61; 414/789.6; 414/790.7; 414/793.4
[58] Field of Search .............. 156/563, 322, 558, 222,
  156/309.9, 380.9, 539, 556, 566; 271/18.3;
  294/61; 414/789.6, 790.7, 793.4

[56] References Cited

U.S. PATENT DOCUMENTS 3,978,571  9/1976  Orlando et al. .......... 414/790.7 X
4,124,242  11/1978  Canner ..................... 294/61
4,688,837  8/1987  Ball et al. .............. 271/18.3 X

FOREIGN PATENT DOCUMENTS 58-50987  11/1983  Japan .
58-194009  12/1983  Japan .
63-89311  4/1988  Japan .
63-91224  4/1988  Japan .
2195618  4/1988  United Kingdom .......... 271/18.3

Primary Examiner—Michael W. Ball
Assistant Examiner—Mark Osele

[57] ABSTRACT

A plurality of thermoplastic sheets are laminated into a laminated assembly, which is then pressed into a laminated assembly. First, the sheets to be laminated in one cycle are heated while the sheets are arranged in a juxtaposed relationship in the order in which they are to be laminated. The heated sheets are penetrated with needles to detachably hold the sheets while keeping the sheets in the juxtaposed relationship. A support member which supports the laminated assembly is moved below the sheets held and relatively to the sheets in a direction in which the sheets are arranged in the juxtaposed relationship, the sheets are released from the needles onto the support member to stack the sheets thereon into the laminated assembly while the support member is being moved relatively to the sheets. The support is then delivered into a shaping die assembly. The laminated assembly on the support member which has been delivered into the shaping die assembly is charged into a charging position in the shaping die assembly, and the support member is removed from the shaping die assembly. The laminated assembly is then pressed into a shaped product with the shaping die assembly after the laminated assembly has been charged into the charging position.

16 Claims, 16 Drawing Sheets

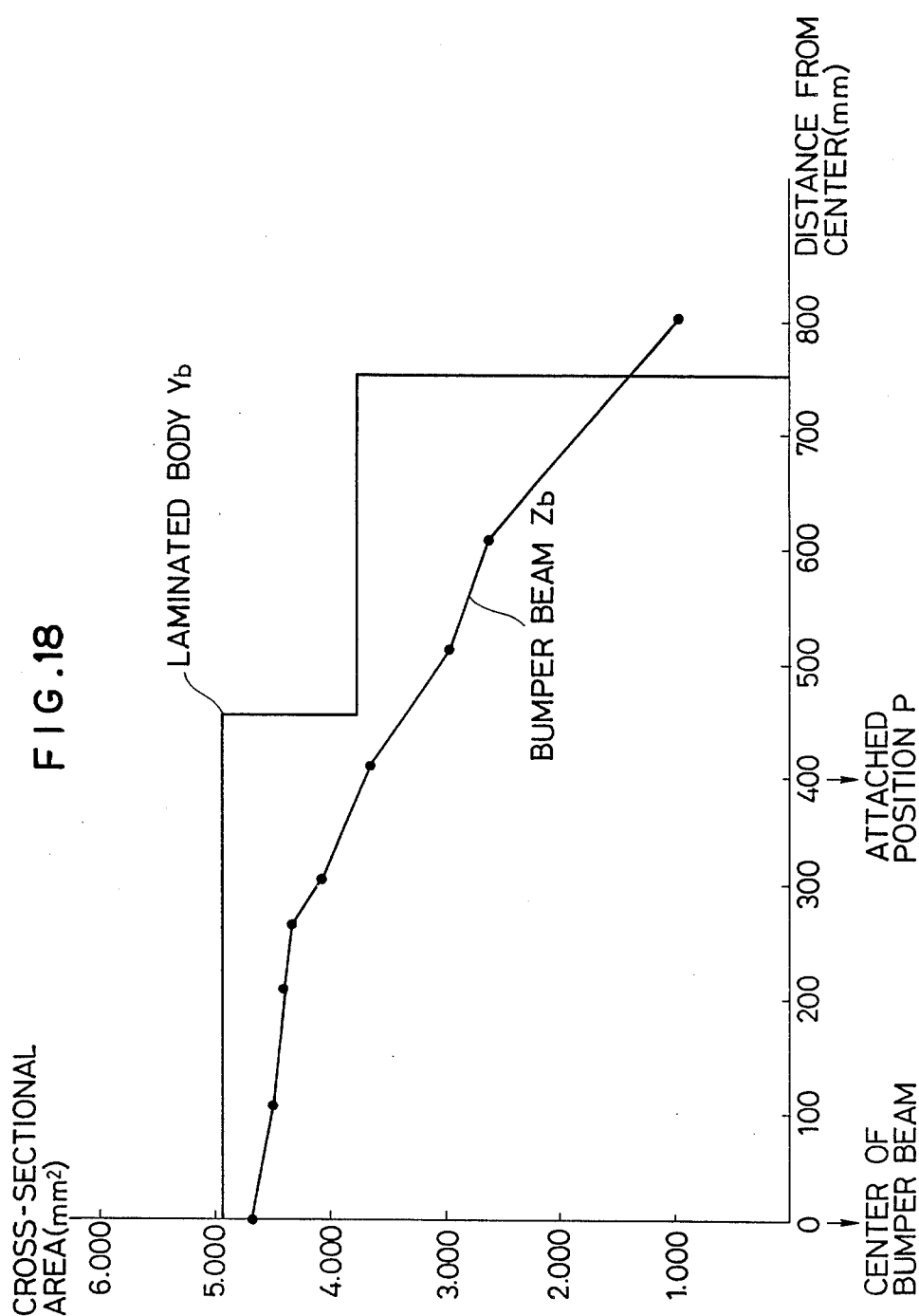

METHOD AND APPARATUS FOR LAMINATING THERMOPLASTIC SHEETS

BACKGROUND OF THE INVENTION

The present invention relates to a method of and an apparatus for laminating and pressing a plurality of thermoplastic sheets such as SMC sheets or the like which will be rendered adhesive when heated.

Recently, automobiles are composed of many parts which are made up of laminated and pressed thermoplastic sheets such as SMC sheets, stampable sheets, or the like that comprise glass fibers, carbon fibers, etc., impregnated with thermoplastic resin. These parts of laminated thermoplastic sheets are used in place of metallic parts for their smaller weight and easy assembling capability. If an automobile component requiring a high mechanical strength such as a bumper beam, for example, is to be fabricated of such sheets, a plurality of thermoplastic sheets are heated until they are sufficiently softened, and then put together into a laminated assembly which is thereafter pressed to shape by a shaping die assembly of a shaping device.

The sheets are made adhesive or sticky when they are softened with heat. Therefore, when these sheets are to be stacked into a laminated assembly or the laminated assembly is to be brought between the shaping dies, the sheets cannot be held by a vacuum attracting device which is usually employed to handle steel sheets.

One known holder device for holding such thermoplastic sheets has needles for penetrating the sheets as disclosed in Japanese Laid-Open Utility Model Publication No. 58-194009 and Japanese Utility Model Publication No. 58-50987. Thermoplastic sheets, which have been heated individually, are successively penetrated by the needles so that the sheets are put together as a laminated assembly, and the laminated assembly is held by the needles. Then, the holder device is moved into a position between the shaping dies, and then the needles are removed from the sheets to leave them in the shaping device.

The disclosed holder device is however disadvantageous for various reasons. Since the sheets are successively held one by one, the efficiency is low. The needles have to be large in diameter for required mechanical strength because the laminated assembly is supported by the needles. If the needles are of a larger diameter, however, large holes are formed in the sheets, thus damaging some fibers of the sheets and lowering the mechanical strength of the final product. Inasmuch as the sheets that are held by the needles are flexed by gravity because they are softened, the holes formed by the needles are enlarged, further impairing the mechanical strength of the shaped product. When the laminated assembly is placed in the shaping die assembly, air may be trapped between the sheets, and any such trapped air will make the shaped product less strong.

SUMMARY OF THE INVENTION

In view of the aforesaid drawbacks of the conventional apparatus and methods of laminating thermoplastic sheets, it is an object of the present invention to provide an apparatus for efficiently laminating a plurality of thermoplastic sheets such as SMC sheets or the like which have been rendered adhesive or sticky by being heated, and positioning the laminated assembly in a shaping die assembly which presses the laminated assembly to shape.

Another object of the present invention is to provide an apparatus for efficiently laminating a plurality of thermoplastic sheets within a short period of time.

Still another object of the present invention is to provide an apparatus for efficiently placing the laminated assembly in a shaping die assembly.

Yet another object of the present invention is to provide an apparatus for reliably and sufficiently heating the thermoplastic sheets.

A further object of the present invention is to provide an apparatus for making a shaped product mechanically strong and reliable.

A still further object of the present invention is to provide an apparatus for efficiently removing a shaped product from within a shaping die assembly.

A yet still further object of the present invention is to provide a method of effecting various operations of the apparatus.

According to a first aspect of the present invention, there is provided an apparatus for heating a plurality of thermoplastic sheets, laminating the heated thermoplastic sheets into a laminated assembly, charging the laminated assembly into a shaping die assembly, and pressing the laminated assembly with the shaping die assembly, the apparatus comprising transfer means for transferring onto a mount table the thermoplastic sheets which are arranged in a juxtaposed relationship in the order in which the sheets will be laminated, mount table feed means for feeding the mount table along a path to a laminating position in which the sheets are laminated into the laminated assembly, heating means disposed in the path for heating the sheets on the mount table, holder means in the laminating position for penetrating the sheets on the mount table with needles from above to detachably hold the sheets and removing the sheets from the mount table while keeping the sheets in the juxtaposed relationship, support means having a support member for supporting the sheets horizontally, the support member being movable below the sheets held by the holder means in the laminating position and relative to the sheets in a direction in which the sheets are arranged in the juxtaposed relationship, laminated assembly forming means for moving the support means relative to the sheets held by the holder means and for causing the sheets to be released from the needles onto the support member to stack the sheets thereon into the laminated assembly while the support member is being moved relative to the sheets, feed means for delivering the support means with the laminated assembly supported thereon from the laminating position into a charging position in the shaping die assembly, and for delivering the support means from the shaping die assembly toward the laminating position after the laminated assembly has been charged into the shaping die assembly in the charging position, and charging means for charging the laminated assembly into the shaping die assembly from the support member which has been delivered into the charging position.

With the above arrangement, when the thermoplastic sheets are laminated and pressed to shape, they are successively heated, laminated, and charged into the shaping die assembly.

The mount table has a mesh member for placing the sheets thereon, the heating means comprising opposite surface heating means for heating the opposite surfaces of the sheets on the mesh member when the mount table is fed by the mount table feed means, the mount table feed means having means for supporting and feeding the mount table at positions to allow the opposite surfaces of the sheets to be heated by the opposite surface heating means.

It is thus possible to heat and soften the sheets sufficiently before they are laminated.

The holder means is vertically movably disposed above the sheets on the mount table fed to the laminating position, the holder means comprising the needles, and lifting/lowering means for lowering the needles in a position to penetrate the sheets and hold the sheets and lifting the needles after having held the sheets to remove the sheets from the mount table.

The laminated assembly forming means comprises delivery means for moving the support means to position the support member successively directly below the sheets held by the needles in the order in which the sheets are to be laminated, and release means for releasing the sheets from the needles onto the support member when the support member is positioned directly below the sheets, respectively.

After the heated sheets have been held by the holder means in the order in which they will be laminated, the sheets are successively dropped onto the support member of the support means which move below the sheets in the direction thereacross, so that the sheets are stacked or laminated on the support member. Therefore, the sheets can be laminated in a short period of time. Since the sheets are separately penetrated and held by the needles, the needles may be of a small diameter.

The support member is vertically movable, the support means having lifting/lowering means for vertically moving the support member to allow the sheets to drop substantially the same distance each time one of the sheets is released from the needles onto the support member in the laminating position.

Because each of the sheets drops substantially the same distance onto the support member when the sheets are laminated, the sheets are laminated under uniform conditions.

The delivery means comprises means for feeding the support member by moving the support means which supports the laminated assembly from the laminating position to the charging position.

The delivery means is thus effectively utilized to deliver the support means which supports the laminated assembly into the shaping die assembly.

The support member of the support means is movable horizontally toward a position released from the laminated assembly, the charging means comprising means for charging the laminated assembly by horizontally moving the support member delivered to the charging position so as to be released from the laminated assembly.

The support member comprises a plurality of pins arranged along a longitudinal direction of the laminated assembly.

This arrangement makes it possible to charge the laminated assembly into the shaping die assembly while maintaining the laminated assembly as it is.

The apparatus further includes pressing means for pressing the laminated assembly on the support member in a direction across the sheets while the support member is being delivered from the laminating position into the shaping die assembly.

By pressing the laminated assembly, air gaps between the laminated sheets are removed, and hence air will not be trapped in the laminated assembly when it is pressed to shape.

The apparatus further includes a shaped product receiver for receiving a shaped product pressed by the shaping die assembly and falling from an upper die of the shaping die assembly in the charging position, locking means for disengageably locking the shaped product receiver between the laminating position and the shaping die assembly, a mounting member disposed on the support means for detachably mounting the shaped product receiver disengaged from the locking means in a position above the laminated assembly on the support member, and attaching and detaching means for releasing the shaped product receiver which has been locked by the locking means and mounting the shaped product receiver on the mounting member while the support means which supports the laminated assembly is being delivered into the shaping die assembly, and for releasing the shaped product receiver, which has been delivered together with the support means from within the shaping die assembly, from the mounting member and locking the shaped product receiver on the locking means after the shaped product receiver mounted on the mounting member has received the shaped product in the shaping die assembly.

The shaped product receiver has an opening defined in one end thereof, the locking means being swingable together with the shaped product receiver locked on the locking means, further including swinging means for swinging the locking means in a direction to lower the opening of the shaped product receiver after the shaped product receiver has been locked on the locking means by the attaching and detaching means.

When the laminated assembly is charged into the shaping die assembly, a shaped product which has been produced in a previous pressing cycle is simultaneously removed from the shaping die assembly.

The support member of the support means is vertically movable, and the apparatus further includes lifting/lowering means on the support means for lifting the support member which supports the laminated assembly toward the shaped product receiver mounted on the mounting member to press the laminated assembly between the support member and the shaped product receiver.

The shaped product receiver is effectively utilized to press the laminated assembly.

The apparatus further includes second mount table feed means for feeding the mount table, after the sheets have been removed from the mount table in the laminating position, toward a position in which a plurality of sheets will be transferred onto the mount table.

The mount table is thus repeatedly used to carry sheets and feed them to the laminating position.

The apparatus is used to form an automobile bumper beam, and the laminated assembly has a thickness increasing stepwise in direction from opposite ends thereof toward a center thereof, the laminated assembly having a vertical cross-sectional area larger than the vertical cross-sectional area of the bumper beam at corresponding positions, the sheets being divided into groups of different lengths larger than at least the distance between substantially symmetric attachment positions on the bumper beam which are spaced in the longitudinal direction thereof from the center of the bumper beam, the bumper beam being adapted to be installed on an automobile body at the attachment positions.

The bumper beam thus produced is of a high mechanical strength.

According to a second aspect of the present invention, there is also provided an apparatus for laminating a plurality of heated thermoplastic sheets placed on a mount table in juxtaposed relation in the order in which the sheets are to be laminated, thus forming a laminated assembly, charging the laminated assembly into a shaping die assembly, and pressing the laminated assembly with the shaping die assembly, the apparatus comprising holder means for penetrating the sheets on the mount table with needles from above to detachably hold the sheets and lifting the sheets from the amount table to remove the sheets therefrom while keeping the sheets in the juxtaposed relationship, support means having a support member for supporting the sheets horizontally, the support member being movable below the sheets held by the holder means in a direction in which the sheets are arranged in the juxtaposed relationship, delivery means for moving the support member into successive positions directly below the respective sheets in the order in which the sheets are to be laminated, release means for releasing the sheets from the needles of the holder means onto the support member when the support member is positioned directly below the sheets, for thereby stacking the sheets on the support member into the laminated assembly, feed means for delivering the support means with the laminated assembly supported thereon into a charging position in the shaping die assembly, and for delivering the support means from the shaping die assembly forward after the laminated assembly has been charged into the shaping die assembly in the charging position, and charging means for charging the laminated assembly into the shaping die assembly from the support member which has been delivered into the charging position.

With the above arrangement, the heater thermoplastic sheets which are placed on mount table in the order in which they are to be laminated are laminated in the same manner as the first aspect described above, and the laminated assemblies can be successively charged into the shaping die assembly. At this time, the heated sheets may be manually placed on the mount table in the juxtaposed condition.

According to the present invention, there is further provided a method of laminating a plurality of thermoplastic sheets into a laminated assembly, and pressing the laminated assembly, the method comprising the steps of heating the sheets to be laminated in one cycle while the sheets are arranged in a juxtaposed relationship in the order in which they are to be laminated, penetrating the heated sheets with needles to detachably hold the sheets while keeping the sheets in the juxtaposed relationship, moving a support member which supports the laminated assembly below the sheets held and relatively to the sheets in a direction in which the sheets are arranged in the juxtaposed relationship, and releasing the sheets from the needles onto the support member to stack the sheets thereon into the laminated assembly while the support member is being moved relative to the sheets, delivering the support member into a shaping die assembly, charging the laminated assembly on the support member which has been delivered into the shaping die assembly, into a charging position in the shaping die assembly, and delivering the support member from the shaping die assembly, and pressing the laminated assembly into a shaped product with the shaping die assembly after the laminated assembly has been charged into the charging position.

The method is used to form an automobile bumper beam, and the sheets are divided into groups of different lengths larger than at least the distance between substantially symmetric attachment positions on the bumper beam which are spaced in the longitudinal direction thereof from the center of the bumper beam, the laminated assembly having a thickness increasing stepwise in direction from opposite ends thereof toward a center thereof, the laminated assembly having a vertical cross-sectional area larger than the vertical cross-sectional area of the bumper beam at corresponding positions.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 18 is a graph showing vertical cross-sectional areas of the bumper beam and the laminated assembly.

DETAILED DESCRIPTION OF THE PREFERRED EMBODIMENT

Figure 1:
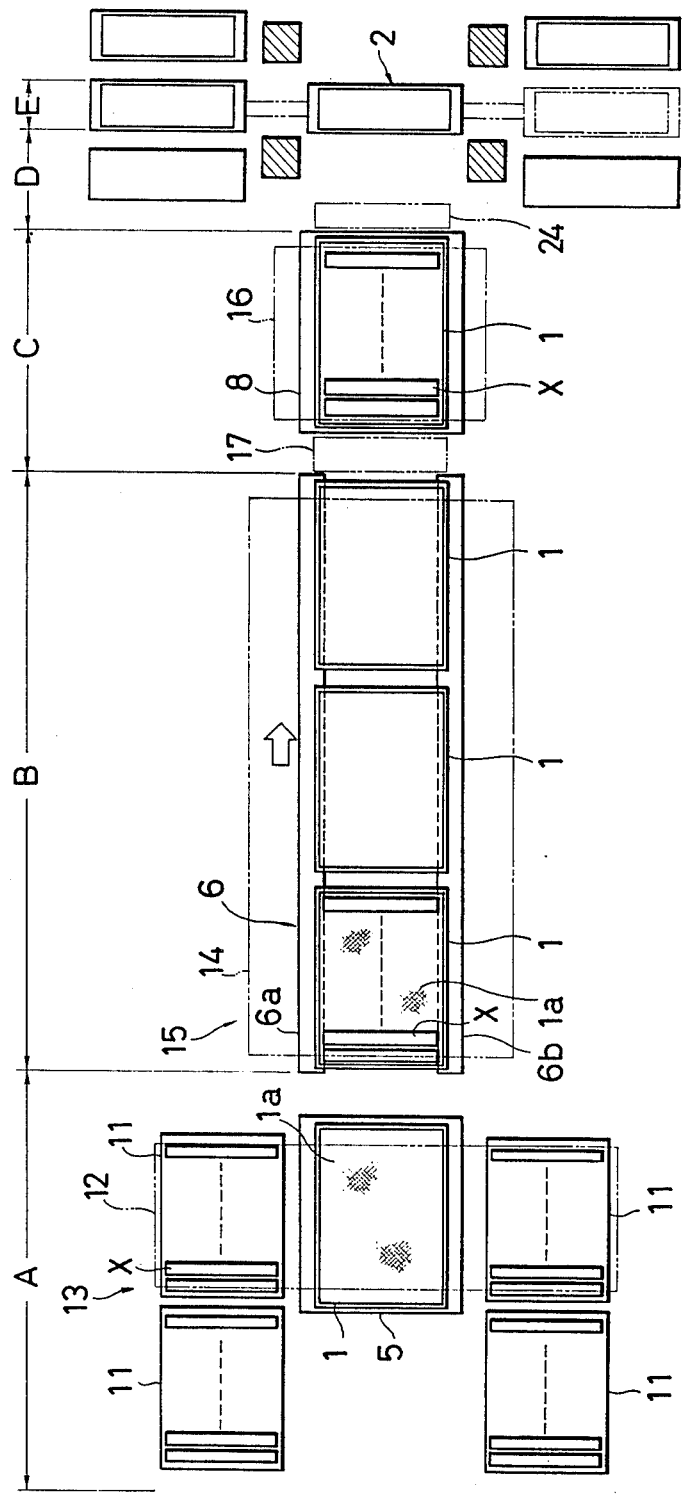
FIG. 1 is a schematic plan view of a production line for laminating and pressing a plurality of thermoplastic sheets.
Figure 2:
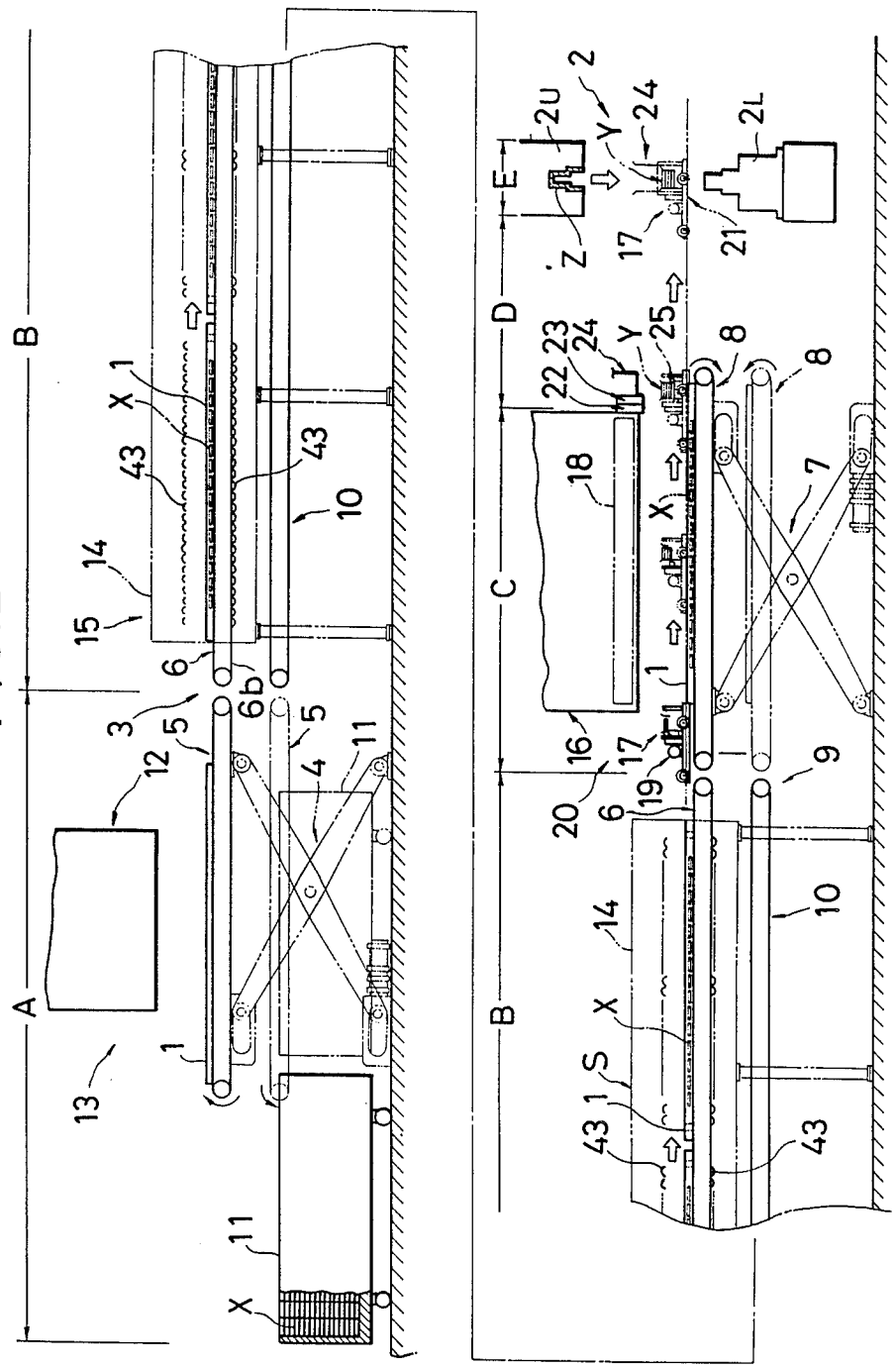
FIG. 2 is a schematic side elevational view of the production line.

FIGS. 1 and 2 schematically show a production line for laminating and pressing a plurality of thermoplastic sheets into a shaped product. The production line incorporates an apparatus for and a method of laminating and pressing such thermoplastic sheets in accordance with the present invention.

As shown in FIGS. 1 and 2, the production line includes a transfer zone A for transferring a plurality of rectangular sheets X arranged side by side in the order in which they will be laminated, onto a mount table 1 comprising a mesh member 1a, a heating zone B for heating the sheets X placed on the mesh member 1a of the mount table 1, a laminating zone C for laminating the heated sheets X into a laminated assembly Y, a charging zone D for charging the laminated assembly Y into a shaping die assembly 2, and a shaping zone E for pressing the laminated assembly Y into shape with the shaping die assembly 2. The production line extends linearly toward the shaping die assembly 2, and the zones A through E are successively arranged downstream along the production line.

A mount table feed means 3 comprises a first feed conveyor 5 disposed in the transfer zone A and vertically movable by a lifter 4, a second feed conveyor 6 disposed in the heating zone B, and a third feed conveyor 8 disposed in the laminating zone C and vertically movable by a lift 7. The mount table 1 is fed from the transfer zone A to the laminating zone C by the mount table feed means 3. A second mount table feed means 9 comprises the third feed conveyor 8, a fourth feed conveyor 10 disposed below the second feed conveyor 6 in the heating zone B, and the first feed conveyor 5, for supporting and feeding the mount table 1 from the laminating zone C to the transfer zone A.

The transfer zone A has a transfer means 13 comprising a carriage 11 for carrying a plurality of thermoplastic sheets X thereon and a transfer device 12. The sheets X are transferred from the carriage 11 onto the mesh member 1a of the mount table 1 on the first feed conveyor 5 by the transfer device 12 in juxtaposed relationship in the order in which the sheets X will be laminated. The mount table 1 with the sheets X mounted thereon is then transferred from the first feed conveyor 5 to the second feed conveyor 6, by which the mount table 1 is fed through the heating zone B toward the laminating zone C in the direction transverse to the sheets X.

The heating zone B has a heating means 15 having a heating furnace 14 through which the second feed conveyor 6 extends. The sheets X on the mount table 1 which is being fed toward the laminating zone C by the second feed conveyor 6 is now heated and softened in the heating furnace 14. The mount table 1, which has passed through the heating furnace 14, is then transferred from the second feed conveyor 6 to the third feed conveyor 8, by which the mount table 1 is stopped in a prescribed position in the laminating zone C.

The laminating zone C has a holder device or holder means 16 disposed above the third feed conveyor 8, a support device or support means 17 movable from a position near the heating furnace 14 in the laminating zone C through a position below the holder device 16 and above the third feed conveyor 8 and also through the charging zone D toward a position in the shaping die assembly 2 in the shaping zone E, and a laminated assembly shaping means 20 comprising a release means 18 on the holder device 16 and a delivery means 19 on the support device 17. The sheets X on the mount table 1 which has been transferred to the third feed conveyor 8 are held in juxtaposed relationship by the holder device 16, and are then lifted from the mount table 1. Thereafter, the support device 17 is moved below the sheets X by the delivery means 19 of the laminated assembly shaping means 20 toward the charging means D in the direction across the sheets X. While the support device 17 is thus being moved, the sheets X are successively released by the release means 18 of the laminated assembly shaping means 20 in the sequence in which the sheets X are to be laminated, and are supported and successively laminated by the support device 17. The laminated sheets X are thus formed into a laminated assembly Y that is supported on the support device 17, which is then delivered into the charging zone D by the delivery means 19.

After the sheets X have been lifted from the mount table 1, the mount table 1 is fed from the laminating zone C back to the transfer zone A by the second mount table feed means 9 so that the mount table 1 will carry sheets X again from the transfer zone A to the laminating zone C.

In the charging zone D, the support device 17 which supports the laminated assembly Y is moved into the shaping die assembly 2 by the delivery means 19 which also doubles as a feed means for feeding the support device 17. The laminated assembly Y is then released from the support device 17 by a charging means 21 on the support device 17, and charged into a position on a lower die 2L of the die assembly 2.

The charging zone D has an attaching and detaching device or means 22 disposed on the holder device 16 and positioned in the charging zone D, a locking means 23 disposed on the attaching and detaching device 22, and a shaped product receiver 24 disengageably locked by the locking means 23. Immediately after the laminated assembly Y is supported by the support device 17, the shaped product receiver 24 is mounted on the support device 17 above the laminated assembly Y by the attaching and detaching device 22, and then the shaped product receiver 24 and the support device 17 are brought into the shaping die assembly 2. The laminated product Y is then pressed by the die assembly 2 into a shaped product Z, which thereafter falls off an upper die 2U onto the shaped product receiver 24.

After the shaped product receiver 24 has been mounted on the support device 17 in the charging zone D, the laminated assembly Y is pressed against the shaped product receiver 24 in the direction across the laminated layers by a pressing means 25.

After the laminated assembly Y has been charged into the die assembly 2 and the shaped product Z has been received by the shaped product receiver 24, the support device and the shaped product receiver 24 are moved out of the die assembly 2 toward the laminating zone C by the delivery means 19. In the position in which the shaped product receiver 24 has been mounted on the support device 17, the shaped product receiver 24 is caused by the attaching and detaching device 22 to be locked again by the locking means 23, whereupon the shaped product Z is discharged. The support device 17 is returned to its original position in the laminating zone C.

In the shaping zone E, after the support device 17 and the shaped product receiver 24 have been removed from the shaping die assembly 2, the laminated assembly Y charged into the die assembly 2 is pressed into the shaped product Z.

A plurality of shaping die assemblies are interchangeably available for use in the shaping zone E so that various shaped products can be produced.

The transfer means 13 and the first feed conveyor 5 in the transfer zone A will be described in detail with reference to FIGS. 1 through 3.

As shown in FIGS. 1 and 2, a plurality of carriages are positioned alongside of the first feed conveyor 5. A plurality of sheets X which will be shaped into a product in a single cycle are placed in juxtaposed relation on each carriage 11 at equal intervals along the direction parallel to the production line in the sequence in which the sheets X are to be laminated. Such sheets X are stacked in layers on the carriages 11.

Figure 3:
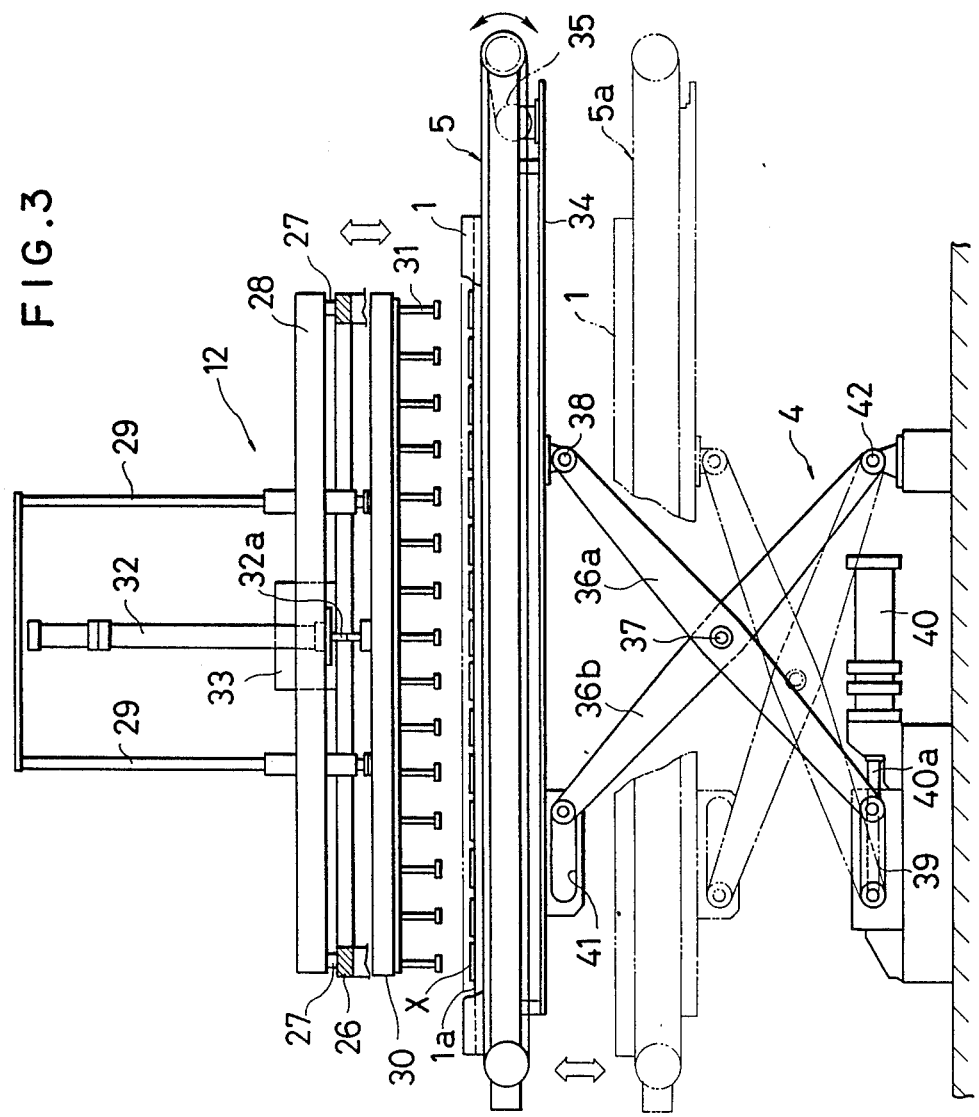
FIG. 3 is a side elevational view of a transfer means and a first feed conveyor.

As illustrated in FIG. 3, the transfer device 12 of the transfer means 13 comprises a main frame 26 disposed above the first feed conveyor 5 and supporting rails 27 extending in a direction at a right angle to the production line, a movable frame 28 movable along the rails 27 from a position above the carriage 11 to a position above the first feed conveyor 5, and a vertically movable frame 30 mounted on the movable frame 28 for vertical movement along guide rails 29. Holder members 31 serving as a second holder means for detachably attracting the sheets X are mounted on the lower surface of the vertically movable frame 30, the holder members 31 being provided in arrays spaced along the production line. There are as many arrays 14 holder members as the number of sheets X to be laminated in one cycle.

The vertically movable frame 30 has a central area coupled to the piston rod 32a of a lifting/lowering cylinder 32 fixed vertically to the movable frame 28. Thus, the vertically movable frame 30 is vertically movable with the holder members 31 in response to operation of the lifting/lowering cylinder 32.

The movable frame 28 is coupled to the piston rod (not shown) of a moving cylinder 33 fixed horizontally to the main frame 26. The movable frame 28 is movable together with the vertically movable frame 30 along the rails 26 in response to operation of the moving cylinder 33.

As shown in FIG. 3, the first feed conveyor 5 is reciprocally movable by a motor 35 fixedly mounted on a frame 34 with its lower surface supported on the lifter 4. The lifter 4 comprises a pair of arms 36a, 36b crossing each other in the shape of an X and angularly movable about a shaft 37 by which the arms 36a, 36b are interconnected. The arm 36a has an upper end pivotally connected to the lower surface of the frame 34 by a shaft 38, and a lower end engaging in a cam groove 39 and coupled to the piston rod 40a of a fixed cylinder 40 which extends in alignment with the cam groove 39. Upon operation of the cylinder 40, therefore, the lower end of the arm 36a is horizontally movable along the cam groove 39.

The arm 36b has an upper end engaging in a cam groove 41 positioned below and fixed to the frame 34, and movable along the cam groove 41, and a lower end pivotally movable about a fixed shaft 42.

The lower ends of the arms 36a, 36b are relatively movable toward and away from each other by the cylinder 40 for thereby lifting and lowering the first feed conveyor 5. As shown in FIG. 2, when the first feed conveyor 5 is elevated, it is positioned at the same height as the second feed conveyor 6. When the first feed conveyor 5 is lowered, it is positioned at the same height as the fourth feed conveyor 10.

Interactive operation of the transfer means 13 and the first feed conveyor 5 will be described below with reference to FIGS. 1 through 3.

The mount table 1 which is empty is fed from the laminating zone C to the transfer zone A by the fourth feed conveyor 10 as described above. When the first feed conveyor 5 is lowered by the lifter 4 as indicated by the imaginary lines in FIGS. 2 and 3, the empty mount table 1 is transferred onto the first feed conveyor 5. At this time, the first feed conveyor 5 has been driven back by the motor 35, and is stopped when the mount table 1 is moved to a position over the first feed conveyor 5. Thereafter, the first conveyor S is lifted by the lifter 4 up to the position at the same level as the second feed conveyor 6.

At this time, the movable frame 28 of the transfer means 13 has been moved, together with the elevated frame 30, to a position over one of the carriages 11 alongside of the first feed conveyor 5.

Then, the holder members 31 are lowered together with the vertically movable frame 30 toward the juxtaposed sheets X on the carriage 11 by the lifting/lowering cylinder 32, whereupon the sheets X are attracted under suction by the holder members 31. After the sheets X have been held by the holder members 31, the vertically movable frame 30 is lifted by the lifting/lowering cylinder 32. With the frame 30 being thus elevated, it is moved, together with the movable frame 28, to a position above the mount table 1 on the first feed conveyor 5 by the moving cylinder 33.

Thereafter, the vertically movable frame 30 and the holder members 31 which are holding the sheets X are lowered toward the mount table 1 by the lifting/lowering cylinder 32, thereby placing the sheets X onto the mesh member 1a of the mount table 1 as shown in FIG. 3, at spaced intervals along the production line. Subsequently, the holder members 31 release the sheets X, and are lifted together with the vertically movable frame 30 by the lifting/lowering cylinder 32, so that the holder members 31 are disengaged from the sheets X. The mount table 1 with the sheets X placed thereon is then transferred onto the second feed conveyor 6 by the first feed conveyor 5 which is driven forwardly by the motor 35, after which the mount table 1 is fed on the second feed conveyor 6 in the direction across the sheets X.

The heating means 15 and the second feed conveyor 6 in the heating zone B will be described below with reference to FIGS. 1 and 2.

The heating furnace 14 of the heating means 15 has a plurality of infrared heaters 43 serving as heating means for heating the opposite sides of the sheets X on the mount table 1 as it is delivered on the second feed conveyor 6. The infrared heaters 43 are positioned along the second feed conveyor 6 as so to lie above and below the mount table 1.

As shown in FIG. 2, the second feed conveyor 6 comprises a pair of conveyors 6a, 6b parallel to each other for supporting the opposite sides of the mount table 1 so that the mesh member 1a of the mount table 1 with the sheets X placed thereon and the lower infrared heater 43 are not isolated from each other.

Therefore, the sheets X on the mount table 1 as it is fed on the second feed conveyor 6 is heated on their opposite surfaces by the infrared heaters 43 in the heating furnace 14. The sheets X will have been sufficiently softened by the time they move out of the heating furnace 14.

The holder device 16 and the third feed conveyor 8 of the laminating zone C will be described in detail with reference to FIGS. 4 through 8.

Figure 4:
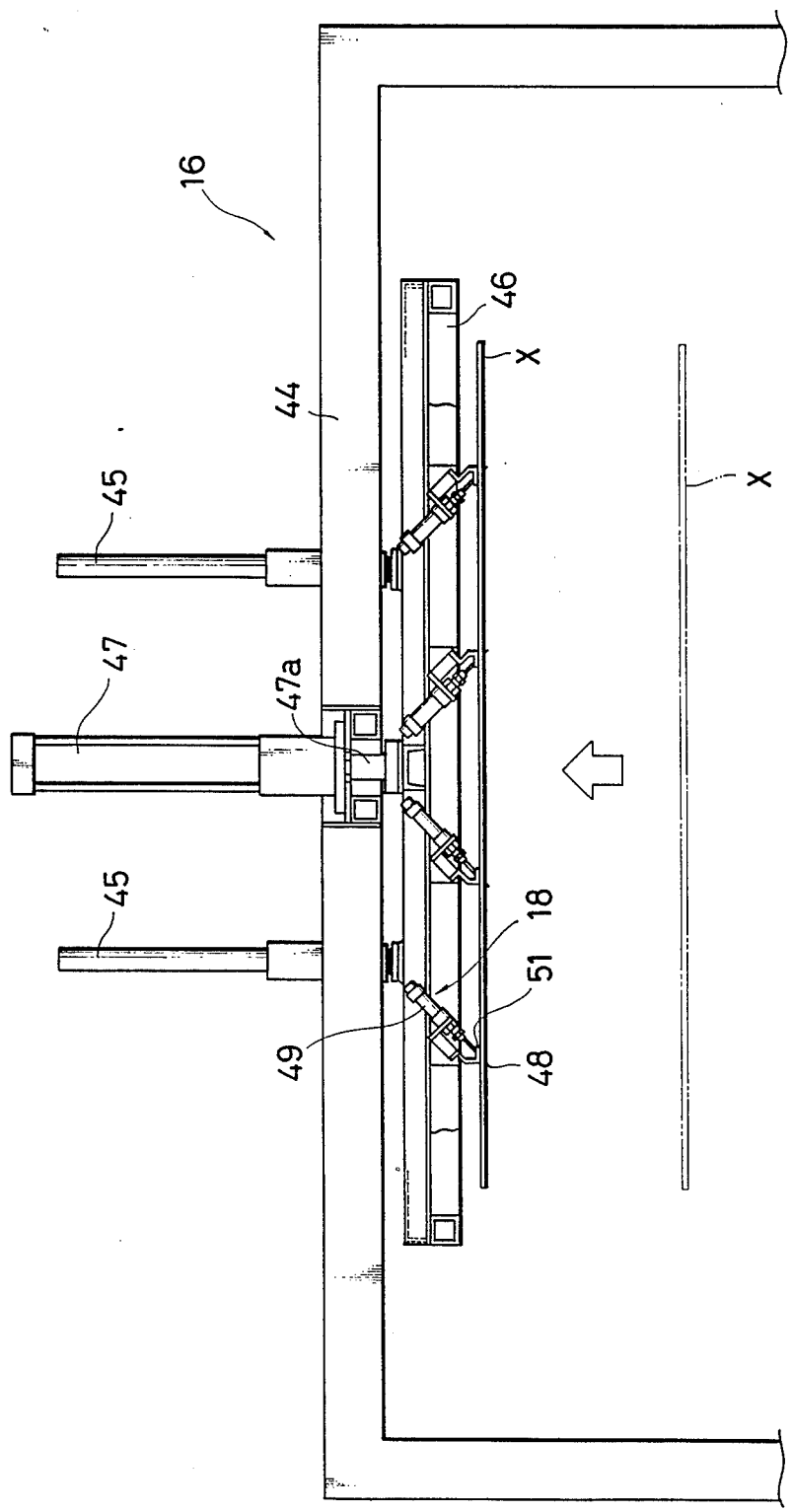
FIGS. 4 and 5 are fragmentary front elevational and plan views of a holder device.
Figure 5:
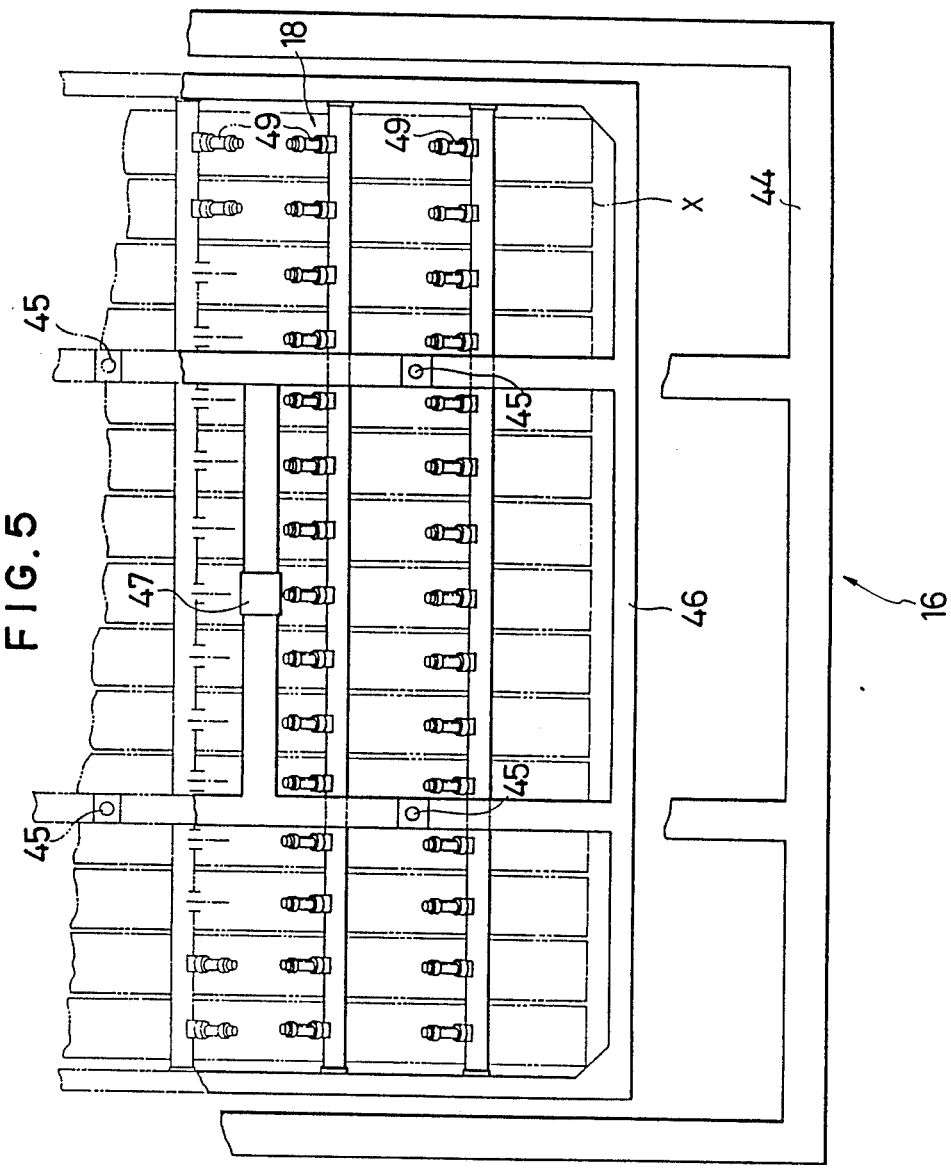
Figure 8:
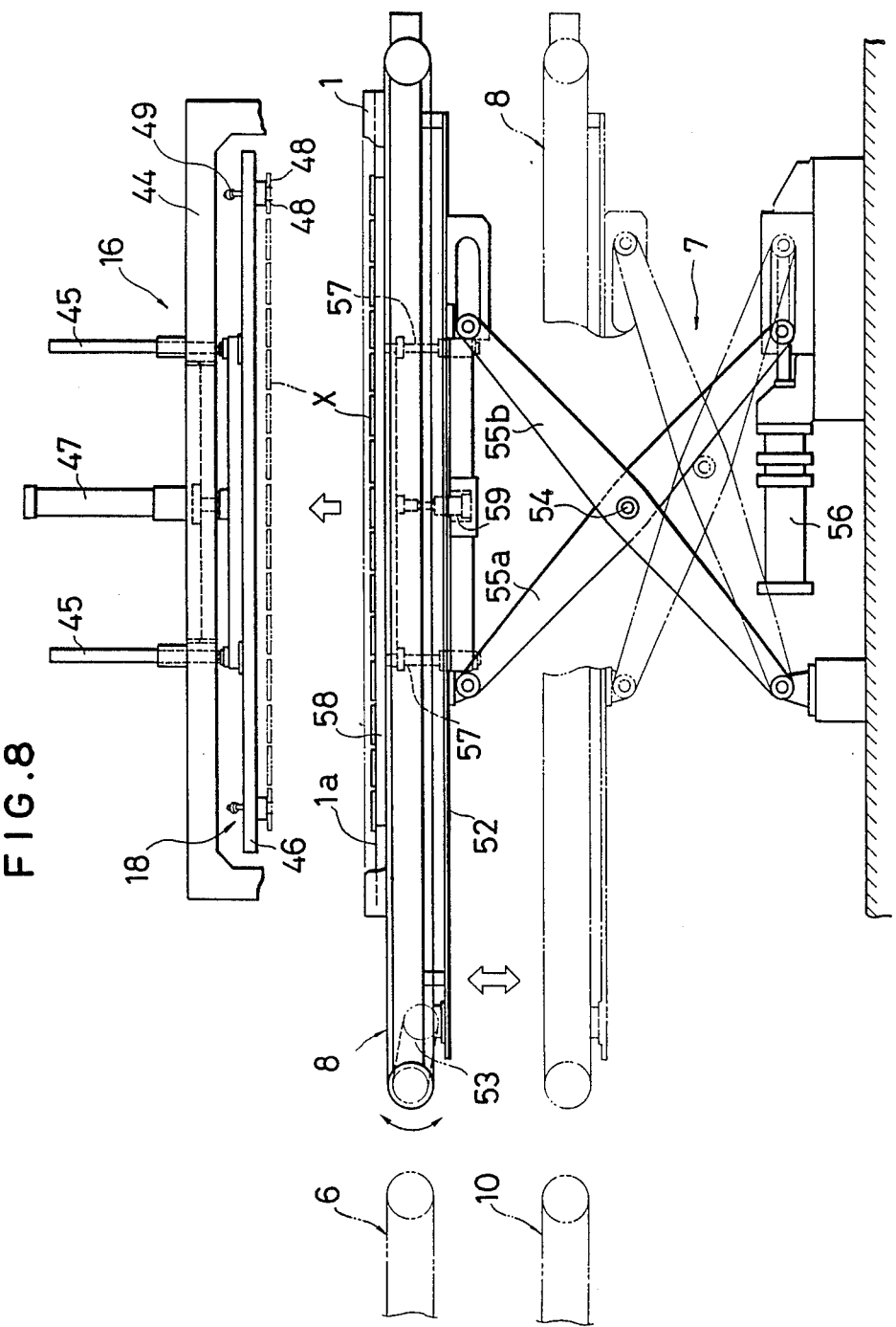
FIG. 8 is a side elevational view of a third feed conveyor and a holder device.

As shown in FIG. 8, the holder device 16 comprises a main frame 44 disposed above the third feed conveyor 8, and a vertically movable frame 46 disposed below the main frame 44 and vertically movable along guide rails 45. The vertically movable frame 46 is coupled to the piston rod 47a of a lifting/lowering cylinder 47 serving as a lifting/lowering means vertically fixed to the center of the main frame 44. As shown in FIGS. 4 and 5, cylinders 49 each having two needles 48 on its lower distal end are fixed to the vertically movable frame 6 and extend obliquely downwardly. As described later on, the cylinders 48 serve as a means for thrusting the needles 48 into the sheets S in order to hold the sheets X placed on the mount table 1, and also serve as the release means 18 for removing the needles 48 from the sheets X to release the sheets X from the holder device 16.

The cylinders 49 are arranged in arrays equally spaced along the production line, there being as many cylinder arrays as the number of sheets X to be laminated in one cycle as shown in FIG. 5. As shown in FIG. 4, each array of the cylinders 49 includes four cylinders spaced at equal intervals, two on each side of the central line of the vertically movable frame 46 which extends perpendicularly to the production line. The four cylinders 49 of each array are directed obliquely downwardly, two cylinders being oriented toward one side and two cylinders toward the other side as shown in FIG. 4.

Figure 6:
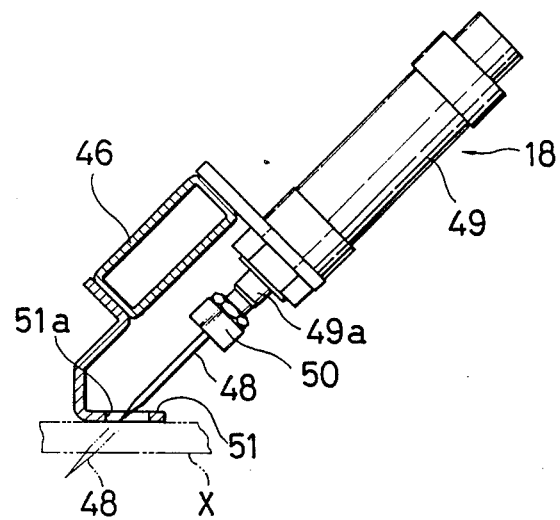
FIGS. 6 and 7 are fragmentary front elevational and bottom views of the holder device.
Figure 7:
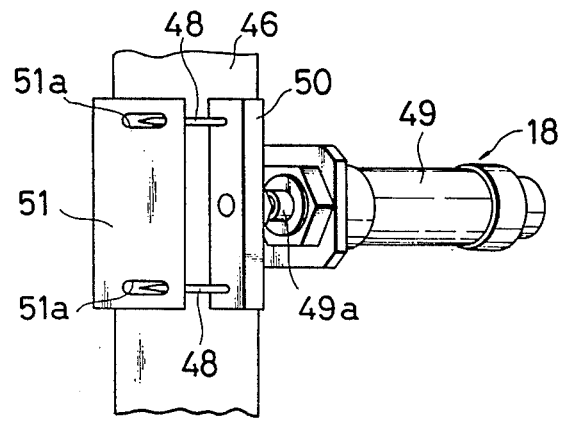

More specifically, as illustrated in FIGS. 6 and 7, each of the cylinders 49 has a flat plate 50 fixed to the distal end of a piston rod 49a, and two needles 48 are mounted on the flat plate 50 in opposite positions thereon and directed in the same downward direction.

As shown in FIGS. 6 and 7, a horizontal flat plate 51 extends from the vertically movable frame 46 toward a position near the tips of the needles 48. The flat plate 51 has through holes 51a defined therein through which the needles 48 can move. When the cylinder 49 is operated to extend the piston rod 49a obliquely downwardly, the needles 48 move through the holes 51a and project downwardly of the flat plate 51 as indicated by the imaginary line in FIG. 6.

As shown in FIG. 8, the third feed conveyor 8 is reciprocally drivable by a motor 53 fixedly mounted on a frame 52 with its lower surface supported on the lifter 7. As with the lifter 4, the lifter 7 lifts and lowers the third feed conveyor 8 when arms 55a, 55b crossing each other in the shape of an X and angularly movably coupled to each other by a shaft 54 are relatively moved toward and away from each other by means of a cylinder 56 coupled to the lower end of the arm 55a. When the third feed conveyor 8 is lifted and lowered, it is positioned at the same height as the second and fourth feed conveyors 6, 10, respectively.

The third feed conveyor 8 has a horizontal abutment plate 58 vertically movable along guide rails 57 below the mesh member 1a of the mount table 1 to be placed on the third feed conveyor 8. The horizontal abutment plate 58 is vertically movable by a cylinder 59 fixed to the frame 52.

Operation of the holder 16 and the third feed conveyor 8 is as follows:

In FIG. 8, the mount table 1 which has been moved on the second feed conveyor 6 through the heating furnace 14 toward the laminating zone C is transferred from the second feed conveyor 6 onto the third feed conveyor 8 when the third feed conveyor 8 is elevated. At this time, the third feed conveyor 8 has been driven forwardly by the motor 53. The mount table 1 is moved on the third feed conveyor 8 until the sheets X on the mesh member 1a are positioned directly below the respective arrays of the cylinders 49, as shown in FIG. 5. The mount table 1 is stopped when the sheets X reach the respective positions immediately below the cylinder arrays, respectively. Thereafter, the abutment plate 58 of the third feed conveyor 8 is elevated toward the sheets X on the mesh member 1a by the cylinder 59 until the abutment plate 58 is held against the sheets X through the mesh member 1a.

Then, the cylinders 49 are lowered together with the vertically movable frame 46 by the lifting/lowering cylinder 47 of the holder device 16. The flat plates 51 are now held against the upper surfaces of the sheets X as indicated by the imaginary lines in FIG. 6. The cylinders 49 are operated to project the needles 48 simultaneously from the holes 51a in the flat plates 51 to penetrate the sheets X. Each of the sheets X is penetrated by four needles 48 at this time. While the sheets X have been softened by being heated, since the lower surfaces of the sheets X are backed up by the abutment plate 58 through the mesh member 1a, the sheets X can easily be penetrated by the needles 48.

Thereafter, the sheets X as they remain juxtaposed are lifted together with the vertically movable frame 46 from the mount table 1 by the lifting/lowering cylinder 47, and are held in the elevated condition. Inasmuch as the four cylinders 49 in each array with the sheet X supported on the needles 48 are obliquely directed with two cylinders oriented away from the other two cylinders, the sheets X are prevented from falling off the needles 48.

The mount table 1, from which the sheets X have been removed, is then lowered with the third feed conveyor 8 by the lifter 7, and then the third feed conveyor 8 is driven back by the motor 53 to transfer the mount table 1 onto the fourth feed conveyor 10 by which the mount table 1 is fed back into the transfer zone A. Consequently, the mount table 1 can efficiently be used repeatedly between the transfer zone A and the laminating zone D.

The support device 17 in the laminating zone C will now be described with reference to FIGS. 9 through 11.

Figure 9:
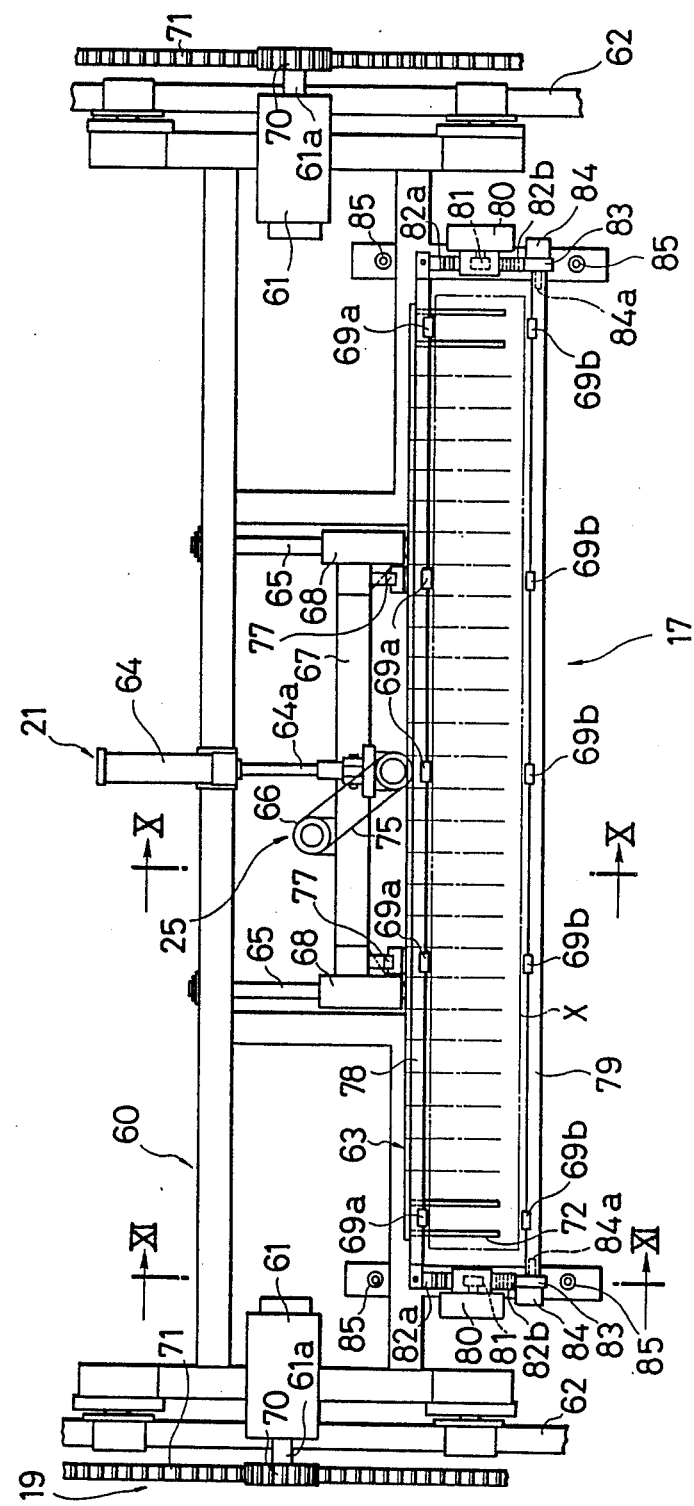
FIG. 9 is a plan view of a support device.
Figure 10:
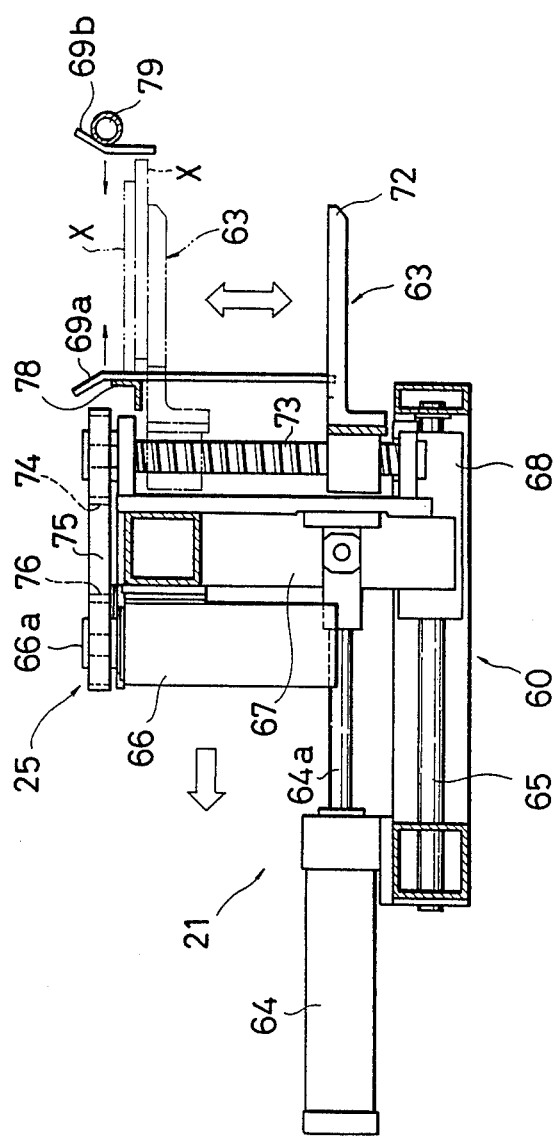
FIG. 10 is a cross sectional view taken along line X—X of FIG. 9.
Figure 11:
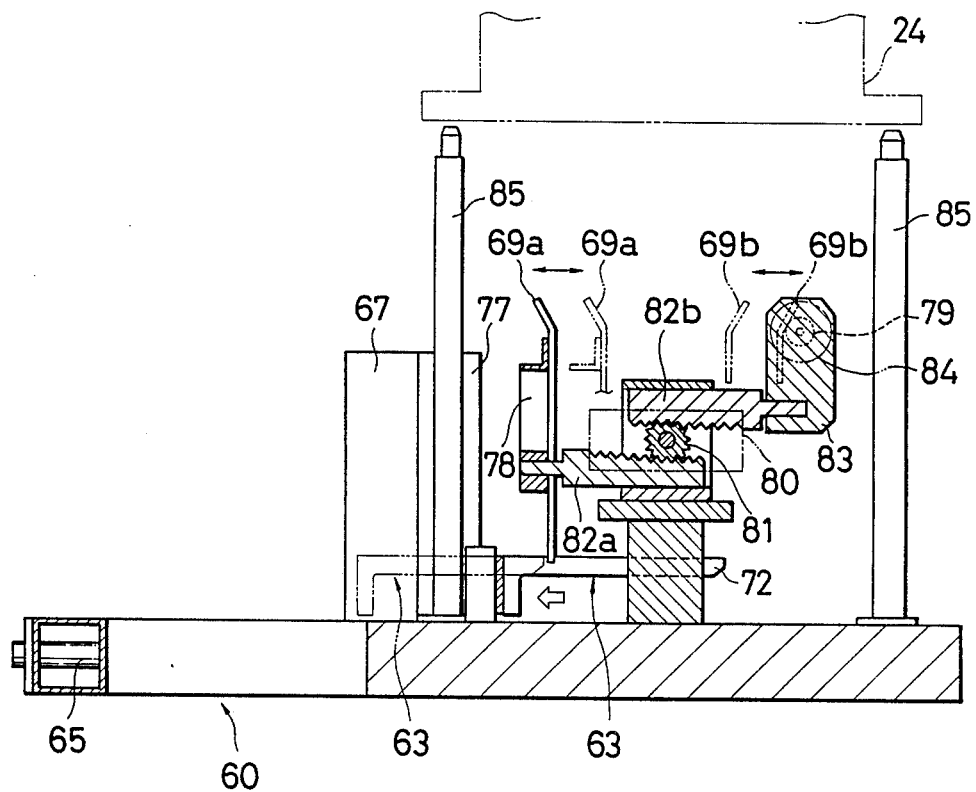
FIG. 11 is a cross-sectional view taken along line XI—XI of FIG. 9.

As shown in FIGS. 9 through 11, a main frame 60 is movable on feed rails 62 parallel to the production line by delivery motors 61 of the delivery means 19. A support member 63 serves to support the sheet X. A cylinder 64 serving as a moving means of the charging means 21 moves the support member 63 along guide shafts 65 on the main frame 60 parallel to the production line. A lifting/lowering motor 66 serves as a lifting/lowering means for lifting and lowering the support member 63, the lifting/lowering motor 66 constituting the pressing means 25. A subframe 67 is coupled to tubular members 68 movably fitted over the respective guide shafts 65. Guide plates 69a, 69b serve to guide each sheet X which has dropped onto the support member 63.

As shown in FIG. 9, the delivery motors 61 are fixedly mounted on the opposite sides of the main frame 60 and have rotatable shafts 61a, respectively, on which there are mounted pinion gears 70 held in mesh with rack rails 71 disposed alongside of the opposite ends of the main frame 60 and extending parallel to the production line.

When the delivery motors 61 are energized, therefore, the main frame 60 is moved together with the delivery motor 61 on the feed rails 62.

The support member 63 comprises a number of parallel horizontal slender pins 72 spaced at equal intervals along a direction normal to the production line and having rear ends joined to each other. The support member 63 has its central rear end threaded over a ball screw 73 which is rotatably mounted vertically on front portion of the subframe 67 as shown in FIG. 10. A driven pulley 74 is mounted on the upper end of the ball screw 73, and operatively coupled through a belt 75 to a drive pulley 76 mounted on the upper end of the rotatable shaft 66a of the lifting/lowering motor 66 which is fixedly mounted on a rear portion of the subframe 67.

Therefore, when the lifting/lowering motor 66 is energized, the ball screw 73 is rotated about its own axis to lift and lower the support member 63 along guide rails 77 (FIG. 9) vertically mounted on front opposite sides of the subframe 67. The support member 63 is shown as being lowered by the solid lines in FIG. 10, and as being lifted by the imaginary lines in FIG. 10.

In FIG. 10, the subframe 67 has a lower central portion coupled to the piston rod 64a of the cylinder 64 which is fixed to the rear central portion of the main frame 60. When the cylinder 64 is operated, the subframe 67 is moved in a direction parallel to the production line, and so is the support member 63. The support member 63 shown by the solid lines in FIG. 11 is moved to the imaginary-line position.

As shown in FIG. 11, the guide plates 69a are vertically fixed to a frame 78 positioned rearwardly and upwardly of the support member 63 and extending perpendicularly to the production line (FIG. 9). The guide plates 69a are spaced at equal intervals.

The guide plates 69b are vertically fixed to a rotatable shaft 79 disposed forwardly and upwardly of the support member 63 and extending parallel to the frame 68. The guide plates 69b are disposed in confronting relation to the guide plates 69a, respectively. The guide plates 69a, 69b have upper ends bent away from each other. As illustrated in FIG. 9, the opposite ends of the frame 78 are joined to the rear ends of racks 82a positioned on the opposite sides of the support member 63 and held in mesh with the lower portions of pinion gears 81 (see also FIG. 11) of rotary cylinders 80 which are fixed to the main frame 60. The rotatable shaft 79 has opposite ends rotatably supported by intermediate members 83 coupled to the front ends of racks 82b which are held in the upper portions of the pinion gears 81 of the rotary cylinders 80.

Therefore, in response to operation of the rotary cylinders 80, the guide plates 69a, 69b are moved in opposite directions by the racks 82a, 82b to vary the distance between the guide plates 69a, 69b depending on the width of the sheets X to be supported on the slender pins 72. The rotatable shaft 79 is rotated about its own axis by the rotatable shafts 84a of rotary cylinders 84 which are connected to the intermediate members 73, respectively, as shown in FIG. 9, for tilting the guide plates 69b.

Two sets of two support rods 85 serving as mounting members for mounting the shaped product receiver 24 are vertically mounted on the main frame 60 at positions forward and rearward of the opposite sides of the support member 63, as shown in FIG. 11.

The support device 17 and the holder device 16 operates in the laminating zone C as follows:

After the sheets X have been elevated, as described above, the support device 17 is moved on the feed rails 62 by the delivery means 19 from a position near the heating furnace 14 toward the shaping die assembly 2 along the rack rails 71 below the sheets X in the direction across the juxtaposed sheets X. At this time, the support member 63 is elevated by the lifting/lowering motor 66 as indicated by the solid lines in FIG. 12.

The support device 17 is temporarily stopped each time the support member 63 is positioned directly below one of the sheets X. While the support device 17 is being held at rest, the four cylinders 49 with their needles 48 holding the sheet X which is positioned above the support device 17 are operated as the release means 18 in the sequence opposite to the sequence described above. The needles 48 are retracted from the sheet X, which then drops toward the support member 63. Since the sheet X is held in abutment against the abutment plate 51 at this time, the needles 48 can easily be pulled out of the sheet X.

By heating the needles 48, they can more easily be pulled out of the sheet X.

The sheet X which has thus dropped is guided by the guide plates 69a, 69b of the support device 17 onto the support member 63, and is horizontally supported on the support member 63. The sheet X can reliably be guided by the guide plates 69a, 69b onto the support member 63 by tilting the guide plate 69b, as described above.

The above sheet releasing process is repeated each time the support member 63 is stopped directly a sheet X while the support device 17 is moving toward the shaping die assembly 2. Thus, the sheets X are successively stacked on the support member 63 in the order in which they are to be laminated. When all the sheets X have been laminated on the support member 63, and the support device 17 has moved past all the sheets X therebelow, the laminated assembly Y is formed on the support member 63. Each time the sheets X are laminated on the support member 63, the support member 63 is lowered in incremental steps by the lifting/lowering motor 66 so that each sheet X falls the same distance from the holder 16 onto the support member 63.

The sheets X stacked on the support member 63 may be positionally displaced as shown in FIG. 10. To avoid this drawback, each time the sheet X is stacked on the support member 63, the guide plates 69a, 69b are moved toward each other by the rotary cylinders 80. The sheets X on the support member 63 are thus pushed and sandwiched between the guide plates 69a, 69b until they are vertically aligned with each other.

The support device 17 on which the laminated assembly Y is thus supported then enters the charging zone D.

The attaching and detaching device 22, the locking means 23, and the shaped product receiver 24 in the charging zone D will be described in detail with reference to FIGS. 13 and 14.

The shaped product receiver 24 is in the form of a box which extends in a direction normal to the production line and is locked by the locking means 23.

The attaching and detaching means 22 comprises a main frame 86 fixed to one end of the main frame 44 of the holder device 16, a subframe 88 vertically movable along guide rails 87 mounted vertically on front opposite sides of the main frame 86, a swingable frame 90 extending perpendicularly to the production line and coupled for angular movement about a swing shaft 89 projecting from a front central portion of the subframe 88, a lifting/lowering cylinder 91 for vertically moving the subframe 88, and a swing cylinder 92 serving as swinging means for swinging the swingable frame 90. The locking means 23 is mounted on the swingable frame 90.

The lifting/lowering cylinder 91 is vertically fixed to the front lower surface of the main frame 86 and has a piston rod 91a coupled to the lower central surface of the subframe 88.

The swing cylinder 92 is horizontally disposed below the swing frame 90 and has a rear portion angularly supported on a side of the subframe 88 by means of a support shaft 93. The swing cylinder 92 has a piston rod 92a angularly movably supported by a support shaft 95 on an extension 94 extending downwardly from a lower central surface of the swingable frame 90.

Figure 12:
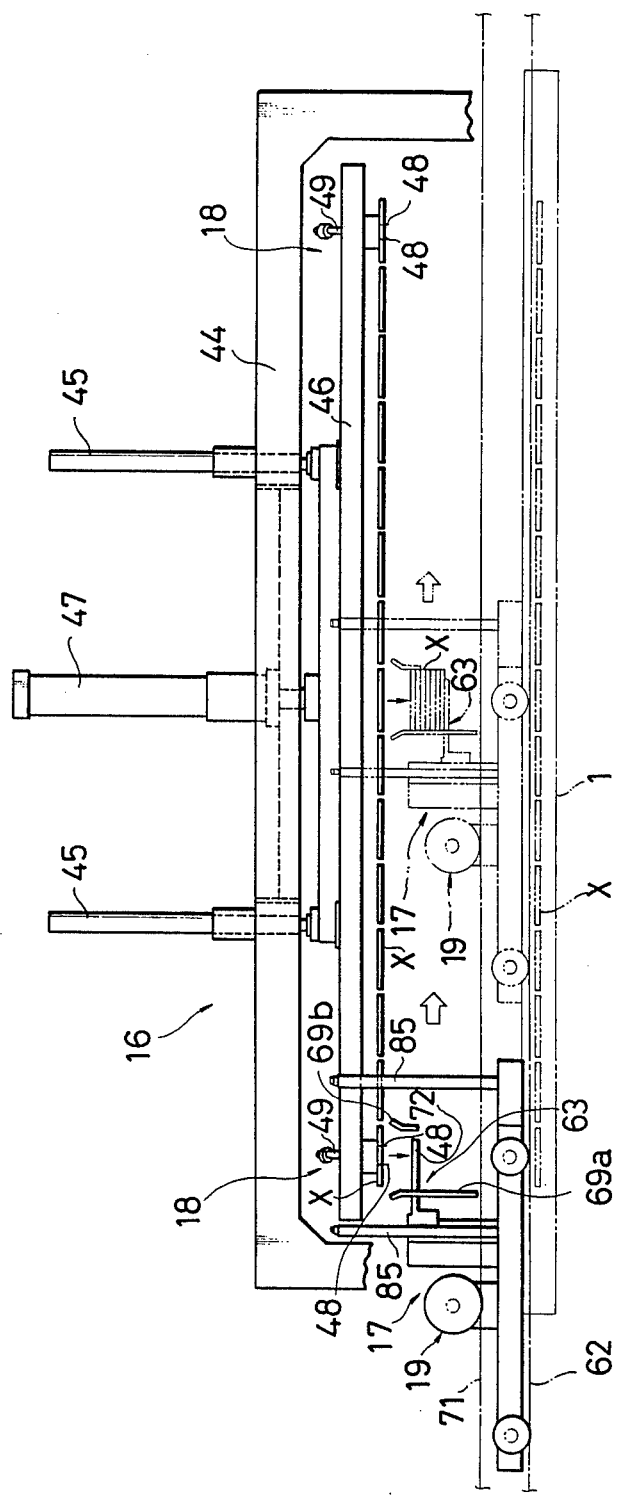
FIG. 12 is a front elevational view showing the manner in which the holder and support devices operate.

The locking means 23 comprises a pair of pins 96a, 96b projecting upwardly from upper and lower portions of the opposite sides of the swingable frame 90. The pins 96a, 96b are inserted respectively in through holes a, b defined in fingers 24a, 24b on the rear end of the shaped product receiver 24. The shaped product receiver 24 is thus locked on the locking means 23 by these pins 96a, 96b so as to extend perpendicularly to the production line as shown in FIGS. 12 and 13.

The shaped product receiver 24 has an opening 24c defined in an end thereof toward which the piston rod 92a of the swing cylinder 92 extends.

The shaped product receiver 24 thus locked by the locking means 23 is vertically moved with the subframe 88, the swingable frame 90, and the locking means 23 by the lifting/lowering cylinder 91. The swingable frame 90 and the locking means 23 are angularly moved about the shaft 89 by the swing cylinder 92, such that the opening 24c of the shaped product receiver 24 is lowered as indicated by the imaginary lines in FIG. 13.

Fingers 97 having through holes 97a for receiving therethrough the upper ends of support rods 85 vertically mounted on the support device 17 are supported on front and rear sides of the shaped product receiver 24.

To mount the shaped product receiver 24 on the support device 17, when the support device 17 is positioned vertically below the shaped product receiver 24 thus locked by the locking means 23, as indicated by the imaginary lines in FIG. 13, the shaped product receiver 24 is lowered by the lifting/lowering cylinder 91 until the upper ends of the support rods 85 are inserted respectively in the holes 97a in the fingers 97. The shaped product receiver 24 is now supported on the support rods 85 and hence mounted on the support device 17. At this time, the subframe 88 and the swingable frame 90 are further lowered by the lifting/lowering cylinder 91, whereupon the pins 96a, 96b are removed from the fingers 24a, 24b on the shaped product receiver 24. The locking means 23 is then released from the shaped product receiver 24.

Figure 13:
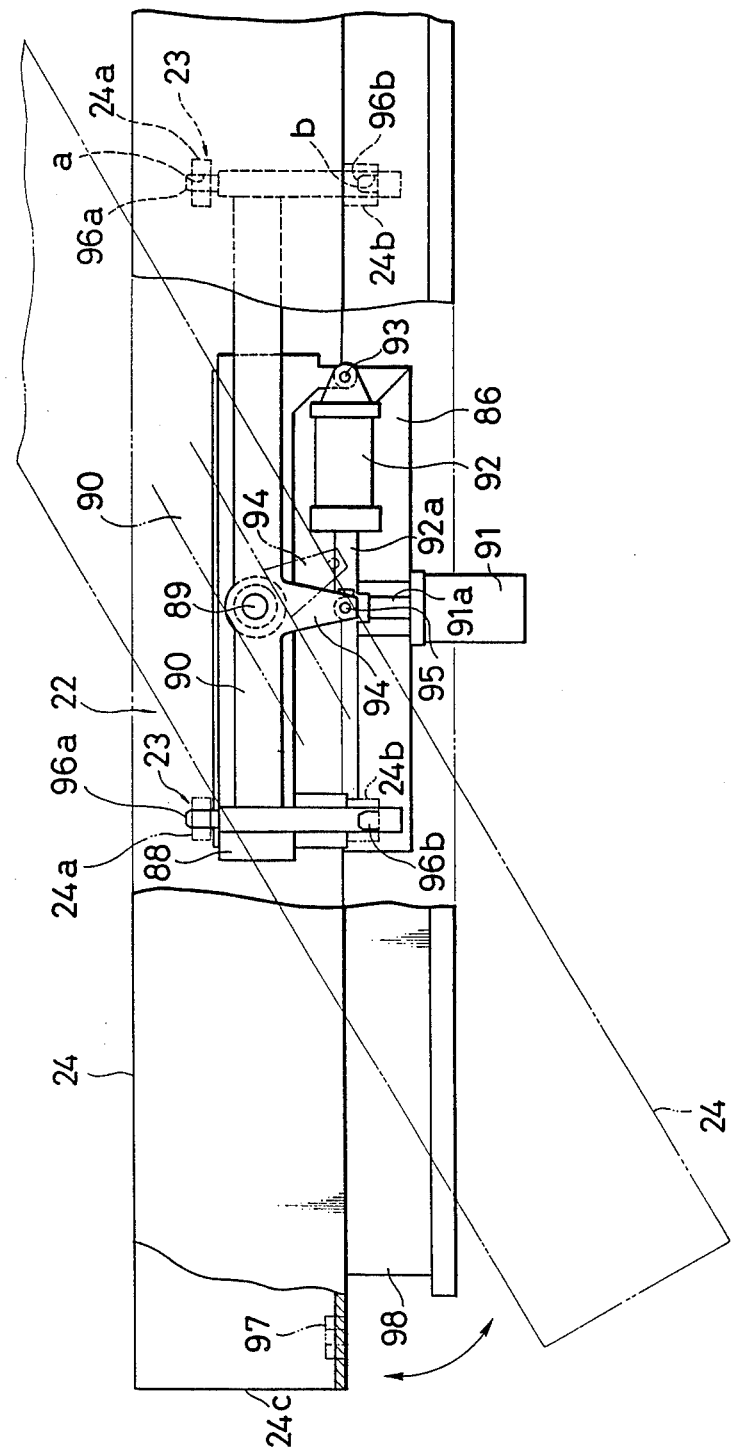
FIGS. 13 and 14 are front and side elevational views of a shaped product receiver, an attaching and detaching device, and a locking means.
Figure 14:
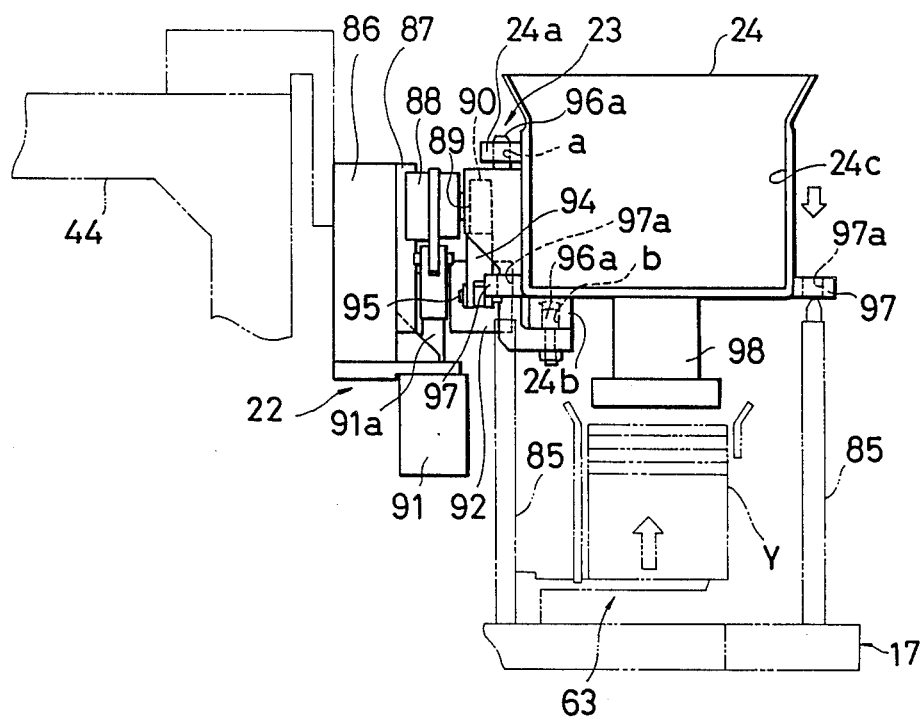

As shown in FIG. 13, a pressing member 98 is mounted on the lower surface of the shaped product receiver 24, the pressing member 98 projecting downwardly. The pressing member 98 serves to press the laminated assembly Y supported on the support member 63 between the pressing member 98 and the support member 63 in the direction across the sheets of the laminated assembly Y.

Figure 15:
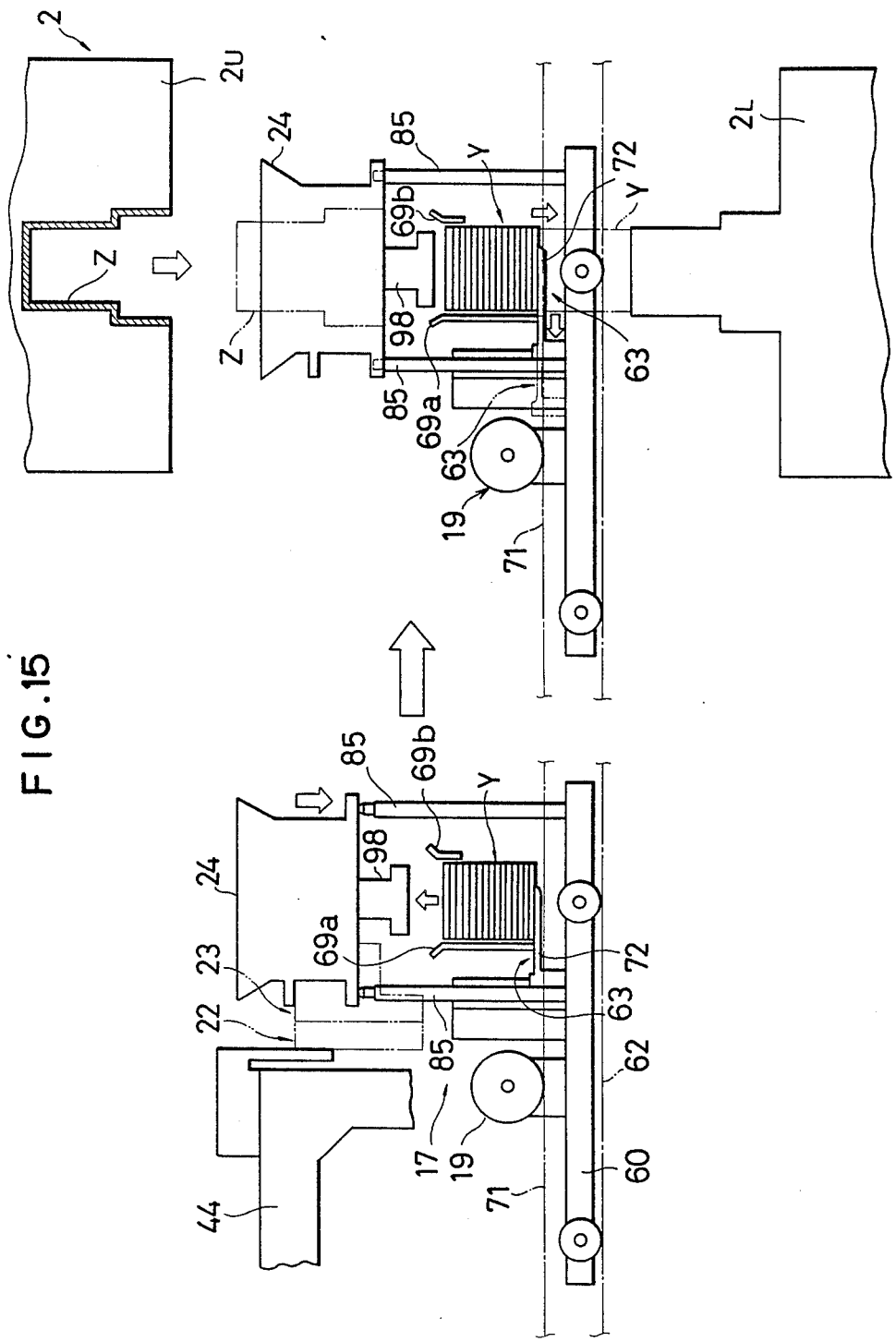
FIG. 15 is a view showing the manner in which the support device and the shaped product receiver operate.

Operation of the support device 17, the shaped product receiver 24, and the attaching and detaching device 22 in the charging zone D will be described with reference to FIG. 15.

While the support device 17 with the laminated assembly Y supported thereon is being moved in the charging zone D by the delivery means 19 toward the shaping die assembly 2, the support device 17 is stopped when the support member 63 supporting the laminated assembly Y is positioned directly below the shaped product receiver 24 locked by the locking means 23.

When the support device 17 is stopped, the shaped product receiver 24 is lowered together with the locking means 23 by the attaching and detaching means 22 until the shaped product receiver 24 is mounted on the support rods 85 and unlocked from the locking means 23.

Then, the support member 63 is elevated toward the pressing member 98 by the lifting/lowering motor 66 of the pressing means 25, thereby pressing the laminated assembly Y between the support member 63 and the pressing member 98. Any gaps which may have been present between the sheets X of the laminated assembly Y are reliably removed, after which the support member 63 is lowered again.

The support device 17 is moved together with the shaped product receiver 24 into the shaping die assembly 2 and then stopped in a position in which the laminated assembly Y is to be charged. Upon stoppage, the support member 63 is horizontally moved away from the laminated assembly Y by the cylinder 64 of the charging means 21, and the laminated assembly Y is released onto the lower die 2L along the guide plates 69a, 69b. While the sheets X of the laminated assembly Y are now being softened and sticky, the pins 72 of the support member 63 can easily be slid and released from the laminated assembly Y.

At the time the laminated assembly Y is thus charged, the shaped product Z which has previously been shaped and attached to the upper die 2U is released from the upper die 2U into the shaped product receiver 24 positioned directly below the upper die 2U.

After the laminated assembly Y has been charged and the shaped product Z has been received in the shaped product receiver 24, the support device 17 is moved together with the shaped product receiver 6 by the delivery means 19 in the direction opposite to that in which they have previously been moved. The support device 17 is thus displaced out of the shaping die assembly 2 and then stopped in the position in which the shaped product receiver has been mounted thereon. When the support device 17 is stopped, the shaped product receiver 6 is locked again on the locking means 23 by the attaching and detaching means 22, and hence released from the support device 17. Thereafter, the support device 17 is moved to the original position in the laminating zone C by the delivery means 19. The shaped product receiver 24 locked by the locking means 23 is angularly moved in such a direction to lower the opening 24c, thereby discharging the shaped product Z from the shaped product receiver 24.

The laminated assembly Y charged into the shaping die assembly 2 is pressed into another shaped product Z by the die assembly 2.

As described above, the sheets X can be heated, laminated, and charged into the shaping die assembly 2 successively efficiently along the production line.

In the laminating zone C, the sheets X are held simultaneously by the holder device 16 while they remain juxtaposed, and then the support device 17 is moved below the sheets X in the direction across the sheets X. During such movement of the support device 17, the sheets X are successively lowered onto the support member 63 of the support device 17 thus forming the laminated assembly Y on the support member 63. Accordingly, the sheets X can be laminated in a short period of time.

To hold the sheets X on the holder device 16, the sheets X are penetrated by the needles 48. Therefore, the diameter of the needles 48 may be small, and hence the sheets X can be held by the needles 48 without impairing the internal structure of the sheets X.

When the sheets X are allowed to drop onto the support member 63 to form the laminated assembly Y, the support member 63 is vertically moved to make uniform the distance which each sheet X is required to traverse. As a result, the sheets X are stacked on the support member 63 under uniform conditions.

In the charging zone D, the laminated assembly Y on the support member 63 is pressed across the sheets X to remove air gaps from between the sheets X. The laminated assembly Y which is horizontally supported on the support member 63 is then brought into the shaping die assembly 2, and the support member 63 is horizontally shifted out of engagement with the laminated assembly Y to charge the laminated assembly Y in the die assembly 2. Thus, the laminated assembly Y can be charged into the shaping die assembly 2 while the laminated assembly Y remains pressed. Accordingly, air is prevented from being trapped in the laminated assembly Y.

The laminated assembly Y is therefore formed in a condition suitable for being pressed, and then charged into the shaping die assembly 2 while the suitable condition is being maintained. Accordingly, the shaped product Z produced by pressing the laminated product Y has a high mechanical strength.

When the laminated assembly Y is pressed, it is pressed between the support member 63 and the shaped product receiver 24 which has been mounted on the support device 17 in the charging zone D. However, the laminated assembly Y may be pressed by any of other means in the charging zone D.

In the charging zone D, the shaped product receiver 24 is mounted on the support device 17 and then brought into the shaping die assembly 2. At the same time that the laminated assembly Y is charged into the shaping die assembly 2, the shaped product Z which has been produced in the previous pressing cycle is received by the shaped product receiver 24. Then, the shaped product receiver 24 and the support device 17 can efficiently be delivered out of the shaping die assembly 2. By thereafter tilting the shaped die assembly 24 which has been delivered from the shaping die assembly 2, the shaped product Z can easily be discharged from the shaped product receiver 24.

Since the support device 17 is moved from the laminating zone C to the shaping die assembly 2 by the delivery means 19, the laminated assembly Y can be formed and then be successively and efficiently charged.

In the illustrated embodiment, when the laminated assembly Y is to be formed, the support device 17 is moved with respect to the holder device 16 by the delivery means 19. However, the laminated assembly Y may be formed by moving the holder device with respect to the support device which is held at rest.

A process of forming an automobile bumper beam Zb along the production line will be described below with reference to FIGS. 16 through 18.

Figures 16, 17:
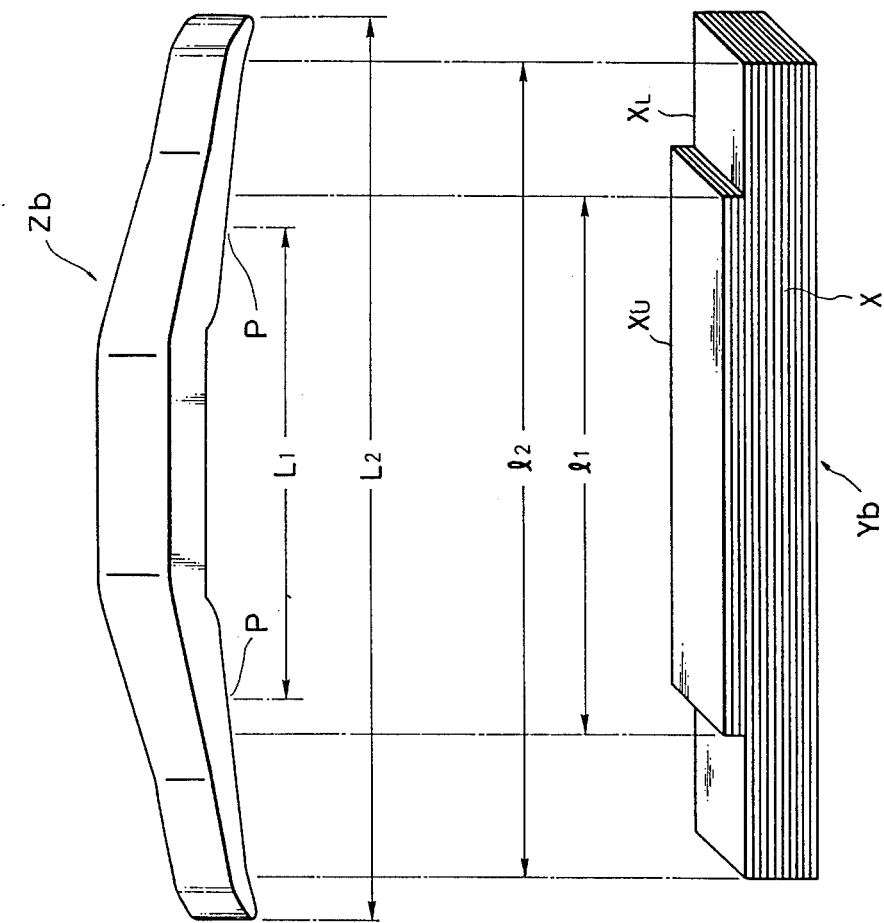
FIG. 16 is a plan view of a bumper beam.
FIG. 17 is a perspective view of a laminated assembly which will be shaped into the bumper beam.

As shown in FIG. 16, the bumper beam Zb has symmetric attachment positions P spaced in its longitudinal direction from its center. The bumper beam Zb will be installed on an automobile body (not shown) at the attachment positions P.

As shown in FIG. 17, a plurality of sheets XU forming an upper layer of a laminated assembly Yb have a length l1, and a plurality of sheets XL forming a lower layer of the laminated assembly Yb have a length l2 which is larger than the length l1. Therefore, the laminated assembly Yb is of a stepped configuration with its thickness increased stepwise in directions from the opposite ends toward the center of the laminated assembly Yb.

The length l1 of the upper-layer sheets XU is slightly larger than the distance L1 between the attachment positions P of the bumper beam Zb. The length l2 of the lower-layer sheets XL is slightly smaller than the entire length L2 of the bumper beam Zb.

The sheets X are dimensioned such that the vertical cross-sectional area of the laminated assembly Yb and that of the bumper beam Zb are related to each other as shown in FIG. 18. More specifically, the vertical cross-sectional area of the bumper beam Zb is gradually reduced from the center to the opposite ends thereof. However, the vertical cross-sectional area of the laminated assembly Yb changes stepwise from a larger value to a smaller value in the directions from the center to the opposite ends thereof, and is larger than that of the bumper beam Zb at any corresponding point therealong.

Each of the sheets X is in the form of a stampable sheet made of thermoplastic resin reinforced by composite long fibers.

The thickness of the laminated assembly Yb which is constructed of the sheets XU, XY having different lengths is increased stepwise in the directions from the opposite ends to the center of the laminated assembly Yb, as described above. The upper-layer sheets XU extend between the attachment positions P of the bumper beam Zb. The vertical cross-sectional area of the laminated assembly Yb is larger than that of the bumper beam Zb. Accordingly, when the laminated assembly Yb is pressed into the bumper beam Zb, the reinforcing fibers of the sheets X extend between the attachment positions P of the bumper beam Zb to increase the mechanical strength of the bumper beam Zb between the attachment positions P.

The laminated assembly Yb thus constructed allows the thermoplastic resin to flow plastically flow in the shaping die assembly. Therefore, the bumper beam Zb is free of problems such as weld marks and waviness, and has an increased mechanical strength.

Although a certain preferred embodiment has been shown and described, it should be understood that many changes and modifications may be made therein without departing from the scope of the appended claims.

What is claimed is:

1. An apparatus for heating a plurality of thermoplastic sheets, laminating the heated thermoplastic sheets into a laminated assembly, charging the laminated assembly into a shaping die assembly, and pressing the laminated assembly with the shaping die assembly, said apparatus comprising:

transfer means for transferring onto a mount table the thermoplastic sheets which are arranged in a juxtaposed relationship in the order in which the sheets will be laminated;

mount table feed means for feeding said mount table along a path to a laminating position in which the sheets are laminated into the laminated assembly;

heating means disposed in said path for heating the sheets on said mount table;

holder means in said laminating position for penetrating the sheets on said mount table with needles from above to detachably hold the sheets and removing the sheets from said mount table while keeping the sheets in the juxtaposed relationship;

support means having a support member for supporting the sheets horizontally, said support member being movable below the sheets held by said holder means in said laminating position and relatively to the sheets in a direction in which the sheets are arranged in the juxtaposed relationship;

laminated assembly forming means for moving said support means relatively to the sheets held by said holder means and for causing the sheets to be released from said needles onto said support member to stack the sheets thereon into the laminated assembly while said support member is being moved relatively to the sheets;

feed means for delivering said support means with the laminated assembly supported thereon from said laminating position into a charging position in the shaping die assembly, and for delivering said support means from said shaping die assembly toward said laminating position after the laminated assembly has been charged into said shaping die assembly in said charging position; and charging means for charging the laminated assembly into said shaping die assembly from said support member which has been delivered into said charging position.

2. An apparatus according to claim 1, wherein said transfer means has second holder means for detachably holding the sheets while keeping the sheets in the juxtaposed relationship, said second holder means being reciprocally movable between a position above the sheets which are disposed outside of the mount table in the juxtaposed relationship and a position above the mount table, and also being vertically movable toward and away from said mount table and the sheets which are disposed outside of the mount table in the juxtaposed relationship, for transferring the sheets onto said mount table from outside of the mount table while keeping the sheets in the juxtaposed relationship.

3. An apparatus according to claim 1, wherein said mount table has a mesh member for placing the sheets thereon, said heating means comprising opposite surface heating means for heating the opposite surfaces of the sheets on said mesh member when said mount table is fed by said mount table feed means, said mount table feed means having means for supporting and feeding said mount table at positions to allow the opposite surfaces of said sheets to be heated by said opposite surface heating means.

4. An apparatus according to claim 1, wherein said holder means is vertically movably disposed above the sheets on the mount table fed to said laminating position, said holder means comprising said needles, and lifting/lowering means for lowering the needles in a position to penetrate the sheets and hold the sheets and lifting said needles after having held the sheets to remove the sheets from said mount table.

5. An apparatus according to claim 1, wherein said laminated assembly forming means comprises delivery means for moving said support means to position said support member successively directly below the sheets held by said needles in the order in which the sheets are to be laminated, and release means for releasing the sheets from said needles onto said support member when the support member is positioned directly below the sheets, respectively.

6. An apparatus according to claim 5, wherein said support member is vertically movable, said support means having lifting/lowering means for vertically moving said support member to allow the sheets to drop substantially the same distance each time one of the sheets is released from said needles onto said support member in said laminating position.

7. An apparatus according to claim 1, wherein said support member of said support means is movable horizontally toward a position released from said laminated assembly, said charging means comprising means for charging the laminated assembly by horizontally moving said support member delivered to said charging position so as to be released from the laminated assembly.

8. An apparatus according to claim 7, wherein said support member comprises a plurality of pins arranged along a longitudinal direction of the laminated assembly.

9. An apparatus according to claim 1, further including pressing means for pressing the laminated assembly on said support member in a direction across the sheets while said support member is being delivered from said laminating position into said shaping die assembly.

10. An apparatus according to claim 1, further including a shaped product receiver for receiving a shaped product pressed by said shaping die assembly and falling from an upper die of the shaping die assembly in said charging position, locking means for disengageably locking said shaped product receiver between said laminating position and said shaping die assembly, a mounting member disposed on said support means for detachably mounting said shaped product receiver disengaged from said locking means in a position above the laminated assembly on said support member, and attaching and detaching means for releasing said shaped product receiver which has been locked by said locking means and mounting the shaped produce receiver on said mounting member while said support means which supports the laminated assembly is being delivered into said shaping die assembly, and for releasing said shaped product receiver, which has been delivered together with said support means from within said shaping die assembly, from said mounting member and locking said shaped product receiver on said locking means after said shaped product receiver mounted on said mounting member has received the shaped product in said shaping die assembly.

11. An apparatus according to claim 10, wherein said shaped product receiver has an opening defined in one end thereof, said locking means being swingable together with the shaped product receiver locked on said locking means, further including swinging means for swinging said locking means in a direction to lower said opening of said shaped product receiver after said shaped product receiver has been locked on said locking means by said attaching and detaching means.

12. An apparatus according to claim 10, wherein said support member of said support means is vertically movable, further including lifting/lowering means on said support means for lifting the support member which supports the laminated assembly toward said shaped product receiver mounted on said mounting member to press said laminated assembly between said support member and said shaped product receiver.

13. An apparatus according to claim 1, further including second mount table feed means for feeding said mount table, after the sheets have been removed from said mount table in said laminating position, toward a position in which a plurality of sheets will be transferred onto said mount table.

14. An apparatus for laminating a plurality of heated thermoplastic sheets placed on a mount table in juxtaposed relation in the order in which the sheets are to be laminated, thus forming a laminated assembly, charging the laminated assembly into a shaping die assembly, and pressing the laminated assembly with the shaping die assembly, said apparatus comprising:

holder means for penetrating the sheets on said mount table with needles from above to detachably hold the sheets and lifting the sheets from said mount table to remove the sheets therefrom while keeping the sheets in the juxtaposed relationship;

support means having a support member for supporting the sheets horizontally, said support member being movable below the sheets held by said holder means in a direction in which the sheets are arranged in the juxtaposed relationship;

delivery means for moving said support member into successive positions directly below the respective sheets in the order in which the sheets are to be laminated;

release means for releasing the sheets from said needles of the holder means onto said support member when the support member is positioned directly below the sheets, for thereby stacking the sheets on said support member into the laminated assembly;

feed means for delivering said support means with the laminated assembly supported thereon into a charging position in the shaping die assembly, and for delivering said support means from said shaping die assembly after the laminated assembly has been charged into said shaping die assembly in said charging position; and charging means for charging the laminated assembly into said shaping die assembly from said support member which has been delivered into said charging position.

15. A method of laminating a plurality of thermoplastic sheets into a laminated assembly, and pressing the laminated assembly, said method comprising the steps of:

heating the sheets to be laminated in one cycle while the sheets are arranged in a juxtaposed relationship in the order in which they are to be laminated;

penetrating the heated sheets with needles to detachably hold the sheets while keeping the sheets in the juxtaposed relationship;

moving a support member which supports the laminated assembly below the sheets held and relatively to the sheets in a direction in which the sheets are arranged in the juxtaposed relationship, and releasing the sheets from said needles onto said support member to stack the sheets thereon into the laminated assembly while said support member is being moved relatively to the sheets;

delivering said support member into a shaping die assembly;

charging the laminated assembly on the support member which has been delivered into the shaping die assembly, into a charging position in the shaping die assembly, and delivering the support member from the shaping die assembly; and pressing the laminated assembly into a shaped product with the shaping die assembly after the laminated assembly has been charged into said charging position.

16. A method according to claim 15, of forming an automobile bumper beam, wherein said sheets are divided into groups of different lengths larger than at least the distance between substantially symmetric attachment positions on the bumper beam which are spaced in the longitudinal direction thereof from the center of the bumper beam, said laminated assembly having a thickness increasing stepwise in direction from opposite ends thereof toward a center thereof, said laminated assembly having a vertical cross-sectional area larger than the vertical cross-sectional area of the bumper beam at corresponding positions.

* * * * *